United States Patent
Kani et al.

(10) Patent No.: US 7,203,422 B2
(45) Date of Patent: Apr. 10, 2007

(54) OPTICAL NETWORK UNIT, WAVELENGTH SPLITTER, AND OPTICAL WAVELENGTH-DIVISION MULTIPLEXING ACCESS SYSTEM

(75) Inventors: Jun-ichi Kani, Yokohama (JP); Katsumi Iwatsuki, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 596 days.

(21) Appl. No.: 10/744,641

(22) Filed: Dec. 22, 2003

(65) Prior Publication Data

US 2004/0264963 A1     Dec. 30, 2004

(30) Foreign Application Priority Data

Dec. 26, 2002     (JP)     ............ P 2002-378079

(51) Int. Cl.
*H04J 14/00*     (2006.01)
(52) U.S. Cl. ............ 398/72; 398/66; 398/67; 398/68; 398/69; 398/70; 398/71; 398/73; 398/79; 398/100; 398/82; 398/84; 398/85; 398/87; 385/24; 385/37; 385/42; 385/50
(58) Field of Classification Search ........... 398/72, 398/66, 67, 68, 69, 70, 71, 100, 73, 79, 82, 398/85, 87, 84; 385/24, 37, 42, 50
See application file for complete search history.

(56) References Cited

U.S. PATENT DOCUMENTS 5,694,234 A    12/1997 Darcie et al.
5,864,413 A    1/1999 Feldman et al.
5,991,058 A *  11/1999 Feuer et al. ............ 398/72

(Continued)

FOREIGN PATENT DOCUMENTS

JP     07-177127     7/1995

(Continued)

OTHER PUBLICATIONS

Akimoto et al., "Spectrum-sliced, 25 GHz 1-25 spaced, 155 Mbpsx32 channel WDM access" Lasers and Electro-Optics, 2001. CLEO/Pacific Rim 2001. The 4th Pacific Rim Conference on Jul. 15-19, 2001, Piscataway, NJ, USA, IEEE, vol. 2, Jul. 15, 2001, pp. 556-557.

(Continued)

*Primary Examiner*—Hanh Phan
(74) *Attorney, Agent, or Firm*—Harness, Dickey & Pierce, P.L.C.

(57) ABSTRACT

In an optical wavelength division multiplexed access system, a center unit (OSU) and n optical network units (ONUs) are connected together via a wavelength splitter and optical fiber transmission lines, and downstream optical signals from the OSU to the ONUs and upstream optical signals from the ONUs to the OSU are transmitted in both directions, the wavelength spacing $\Delta\lambda d$ (optical frequency spacing $\Delta f d$) of the downstream optical signals is set to twice or more the wavelength spacing $\Delta\lambda u$ (optical frequency spacing $\Delta f u$) of the upstream optical signals, each ONU transmits an upstream optical signal whose optical spectral width is twice or more $\Delta\lambda u$ ($\Delta f u$), and the wavelength splitter spectrum slices the upstream signals transmitted from the ONUs into wavelengths (optical frequencies) whose optical spectral widths are mutually different within $\Delta\lambda u$ ($\Delta f u$), and wavelength-division multiplexes them and transmits to the OSU.

25 Claims, 15 Drawing Sheets

U.S. PATENT DOCUMENTS 6,597,482 B1 * 7/2003 Chung et al. .................. 398/87
2002/0196491 A1 12/2002 Deng et al.

FOREIGN PATENT DOCUMENTS

| | | |
|---|---|---|
| JP | 08-008878 | 1/1996 |
| JP | 2000-196536 | 7/2000 |
| JP | 2001-177505 | 6/2001 |
| JP | 2003-134058 | 5/2003 |

OTHER PUBLICATIONS

European Search Report dated Mar. 16, 2006.

K. Akimoto et al.; "Spectrum-sliced, 25-GHz spaced, 155 Mbps x 32 channel WDM access"; The 4th Pacific Rim Conference on Lasers and Electro-Optics, 2001 (CLEO/Pacific Rim 2001); vol. 2, pp. II-556-557.

K. Akimoto et al.; "Gigabit WDM-PON systems using spectrum slicing technologies"; Technical Report of IEICE; The Institute of Electronics, Information and Communication Engineers; CS2003-13, OCS2003-20, PS2003-20; May 2003.

K. Akimoto et al.; "Gigabit WDM-PON system using spectrum-slicing technologies"; 29th European Conference on Optical Communication, AEI (Associazione Electtrotecnica ed Elettronica Italiana); Sep. 2003.

* cited by examiner

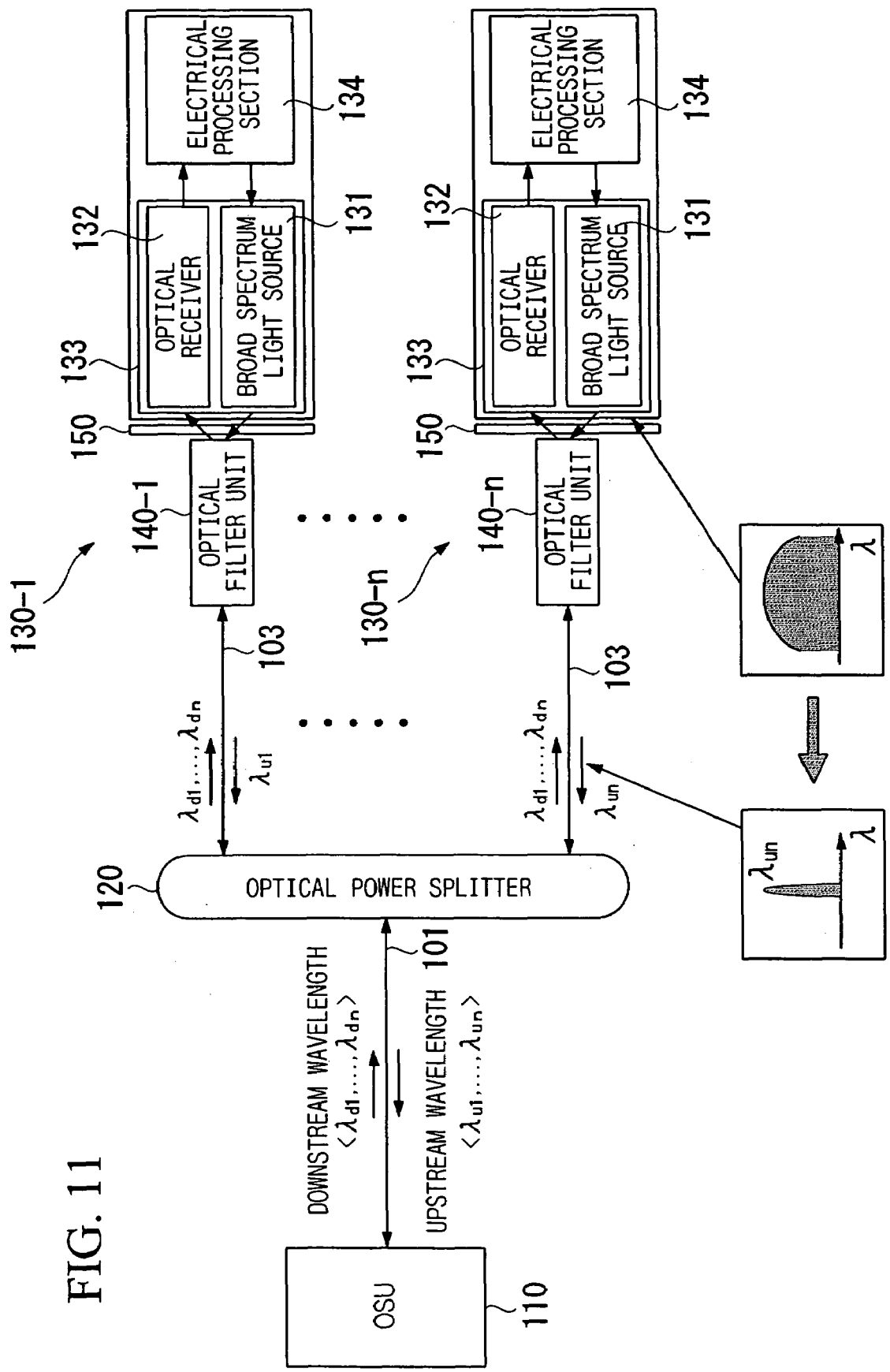

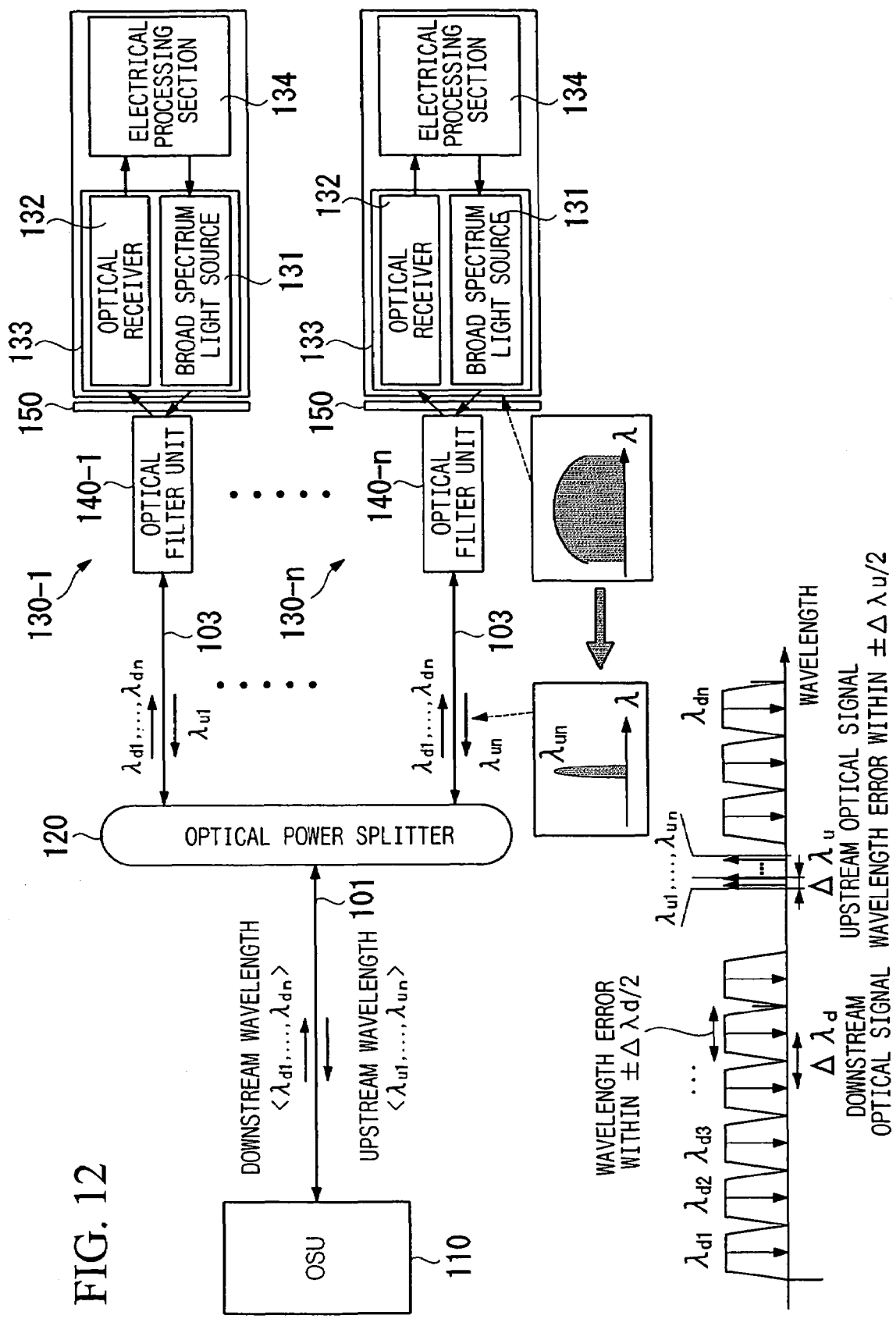

OPTICAL NETWORK UNIT, WAVELENGTH SPLITTER, AND OPTICAL WAVELENGTH-DIVISION MULTIPLEXING ACCESS SYSTEM

BACKGROUND OF THE INVENTION

1. Field of the Invention

The present invention relates to an optical wavelength-division multiplexing (WDM) access system which transmits optical signals between a center unit (OSU; Optical Subscriber Unit) and a plurality of optical network units (ONUs) in both directions.

Priority is claimed on Japanese Patent Application No. 2002-378079, filed Dec. 26, 2002, the content of which is incorporated herein by reference.

2. Description of Related Art

As one embodiment of an optical multiplexing access system, an optical wavelength-division multiplexing (WDM) access system in which each of the ONUs occupies a different wavelength upon a star type optical access line which multiplexes and demultiplexes a plurality of signals via wavelength splitters is investigated.

FIG. 14 shows a structural example of a conventional optical wavelength-division multiplexing access system (which is disclosed in Japanese Unexamined Patent Application, First Publication No. 2000-196536, hereinafter termed Patent Reference 1). Here, by way of example, a single wavelength band $\lambda d$ is assigned for transmission of downstream signals from the OSU to the ONUs, and a single wavelength band $\lambda u$ ($\neq \lambda d$) is assigned for transmission of upstream signals from the ONUs to the OSU, and moreover respective wavelengths $\lambda d1$ through $\lambda dn$ of the wavelength band $\lambda d$ and respective wavelengths $\lambda u1$ through $\lambda un$ of the wavelength band $\lambda u$ are assigned to the respective ONUs.

A transmitting section 51 of the OSU 50 performs wavelength-division multiplexing of the downstream optical signal of the wavelength band $\lambda d$ (the wavelengths $\lambda d1$ through $\lambda dn$) and of the optical carrier for upstream transmission of the wavelength band $\lambda u$ (the wavelengths $\lambda u1$ through $\lambda un$), and transmits them to a wavelength splitter 60 via an optical fiber transmission line 1. The wavelength splitter 60 demultiplexes the downstream optical signal of the wavelength band $\lambda d$ and the optical carrier for upstream transmission of the wavelength band $\lambda u$, and transmits the downstream optical signal of the wavelengths $\lambda d1$ through $\lambda dn$ and the optical carriers for upstream transmission of the wavelengths $\lambda u1$ through $\lambda un$ to respectively corresponding ONUs 70-1 through 70-n via optical fiber transmission lines 3.

The ONU 70-1 demultiplexes the downstream optical signal of wavelength $\lambda d1$ which has been transmitted and has arrived and the optical carrier for upstream transmission of wavelength $\lambda u1$ with a WDM coupler 71, and receives the downstream optical signal of wavelength $\lambda d1$ with an optical receiver 32, while it modulates the optical carrier for upstream transmission of wavelength $\lambda u1$ with an optical modulator 73, and transmits the modulated optical signal via an optical fiber transmission line 4 to the wavelength splitter 60 as an upstream optical signal. The same processes are performed by the other ONUs. The upstream optical signals of wavelengths $\lambda u1$ through $\lambda un$ which have been transmitted from the respective ONUs are wavelength-division multiplexed by the wavelength splitter 60, then are transmitted to the OSU 50 via an optical fiber transmission line 2 for upstream transmission, and are received by a receiving section 52 thereof.

Here, as shown in FIG. 14, the wavelength band $\lambda d$ (the wavelengths $\lambda d1$ through $\lambda dn$) of the downstream optical signal and the wavelength band $\lambda u$ (the wavelengths $\lambda u1$ through $\lambda un$) of the optical carrier for upstream transmission are disposed so that they do not overlap in the wavelength domain. The array waveguide grating (AWG) which is used as the wavelength splitter 60 has the characteristic that it can multiplex and demultiplex wavelengths of a FSR (free spectral range) spacing simultaneously. Due to the characteristic of FSR, it is possible to demultiplex the downstream signal wavelengths (for example $\lambda d1$) and the upstream signal wavelengths (for example $\lambda u1$) upon the same port. With this exemplary conventional technique, it is anticipated that, by taking advantage of this function, it will be possible to standardize the structural elements of the respective ONUs (i.e. to reduce the number of different types of component incorporated in them). In other words, it is possible to demultiplex the downstream optical signal and the optical carrier for upstream transmission by utilizing a WDM coupler 71 of the same specification at each ONU for demultiplexing the wavelength band $\lambda d$ and the wavelength band $\lambda u$, and to ensure that the optical carriers for upstream transmission do not induce any interference in the optical receivers 72.

It should be understood that a method may also be proposed of, when transmitting the optical carriers for upstream of the wavelengths $\lambda u1$ through $\lambda un$ from the transmitting section 51 of the OSU 50 as broadband light which includes the wavelengths $\lambda u1$ through $\lambda un$, spectrum slicing with the wavelength splitter 60 into the optical carriers for upstream transmission of wavelengths $\lambda u1$ through $\lambda un$ and transmitting to each ONU (this is disclosed in Japanese Unexamined Patent Application, First Publication No. 2001-177505, hereinafter termed Patent Reference 2).

In this connection, this type of expedient takes as its objective to standardize the structural elements of the ONUs 70-1 through 70-n as described above (i.e. to reduce the number of different types of component incorporated in them). In other words, by first supplying the optical carrier for upstream transmission of each wavelength from the OSU 50 to each ONU, it is possible to increase the compatibility without it being necessary to incorporate individual light sources of the respective wavelengths which are respectively assigned to the ONUs. Next, it is possible to increase the compatibility of the WDM couplers 71 in the respective ONUs by dividing the wavelength band $\lambda d$ for the downstream signals from the wavelength band $\lambda u$ for the upstream signals by taking advantage of the functions of the AWG as described above.

Furthermore, in Japanese Unexamined Patent Application, First Publication No. Heisei 8-8878 (hereinafter termed Patent Reference 3) and in Japanese Patent Application No. 2002-231632 (published as Japanese Unexamined Patent Application, First Publication No. 2003-134058 and hereinafter termed Patent Reference 4), it has been proposed to use a single type of ONU and thus to reduce the manufacturing cost by implementing a spectrum slicing scheme.

Apart from the above, as a one-way point to point transmission system, there is an example which applies a spectrum slicing scheme by incorporating and using a wide spectrum light source and a single input single output type optical band-pass filter in its light source section (see Japanese Unexamined Patent Application, First Publication No. Hei 7-177127, hereinafter termed Patent Reference 5).

Furthermore, as shown in FIG. 15, there has also been proposed a structure in which, in a construction in which an OSU 50 and a plurality of ONUs 70-1 through 70-n. are mutually opposed to one another via a wavelength splitter 60 for which an AWG or a multi-port wavelength filter is utilized, an identical optical transmitter 75 which modulates broadband light having a wide spectral width in the wavelength domain is allocated to each ONU, and this broadband light (λu) is modulated by each of the ONUs and is transmitted as an upstream optical signal, and is spectrum-sliced and wavelength-division multiplexed by the wavelength splitter 60, then being transmitted to the OSU 50 (see K. Akimoto et al., "Spectrum-sliced, 25-GHz spaced, 155 Mbps×32 channel WDM access", The 4th Pacific Rim Conference on Lasers and Electro-Optics, 2001 (CLEO/Pacific Rim 2001), Vol. 2, pp. II-556–557, hereinafter referred to as Non-Patent Reference 1). Although this structure is substantially equivalent to one in which upstream optical signals of different wavelengths are transmitted from respective ONUs, it is possible to provide a light source of the same specification to each ONU.

It should be understood that, in order to obtain modulated light of a wide optical spectral width, a method may be utilized of directly modulating a super-luminescent diode or a semiconductor optical amplifier with an electrical signal; or, alternatively, a method may be utilized of modulating the output light (broadband non-modulated light) of a semiconductor optical amplifier or of an erbium-doped optical fiber amplifier with an external modulator.

On the other hand, as another type of optical multiplexing access system, upon a star type optical access line in which a plurality of signals are combined and split via an optical power splitter, there is a system in which each ONU performs two-way transmission with the OSU by occupying a different wavelength. As a conventional such system, there is a time-division multiplexing (TDM) system which assigns a different time slot to each ONU (such as a G.983.1 B-PON system according to the ITU-T standard, or the like).

In this connection, with a laser light source which is used for creating an optical signal of a designated wavelength, when the wavelength spacing of a plurality of optical signals which are multiplexed together becomes less than, for example, a few nm, then due to temperature control and the like a wavelength control circuit becomes necessary, and it is not possible to avoid increase of cost. When a normal distributed feedback (DFB) laser without a temperature control circuit is employed, a 20 nm wavelength spacing is established as a standard (ITU-T G.694.2) by the International Telecommunication Union Telecommunication Standardization Sector, in consideration of the fact that a wavelength variation of about ±6~7 nm occurs over a range of about, for example, ±35° C.

When the optical wavelength-division multiplexing access system shown in FIG. 14 is constructed based upon this standard, then the wavelengths λu1 through λun of the optical carriers for upstream transmission come to be spaced at 20 nm spacings, and the wavelength band which is needed for the optical modulators 73 of the n ONUs needs to be about 20×n (nm) wide. On the other hand, when semiconductor optical amplifiers or electroabsorption optical modulators are used as the optical modulators 73, since their operating wavelength bands are about 20 to 60 nm, accordingly, if an attempt is made to manage with a single type of optical modulator, it only becomes possible to connect one to three ONUs.

Furthermore, when the optical wavelength-division multiplexing access system shown in FIG. 15 is constructed based upon the above described standard, then the wavelength band which is required for the optical transmitters 75 of the n ONUs needs to be about 20×n (nm) wide. On the other hand, when super-luminescent diodes, semiconductor optical amplifiers, or erbium-doped optical fiber amplifiers are used as the light sources for the optical transmitters 75, since their optical spectral widths are about 20 to 60 nm, accordingly, if an attempt is made to manage with a single type of light source, again, it only becomes possible to connect one to three ONUs.

On the other hand, as has been described above, if ONUs each of which occupies a different wavelength are to perform two-way transmission with an OSU upon a star type optical access line in which a plurality of signals are combined and split via an optical power splitter, then it is necessary to provide a light source of its own individual different wavelength to each ONU, and the problem arises of increase of cost due to greater multiplicity of component types in the ONUs. Furthermore, there has not been proposed detailed structure for such ONUs which are to perform two-way transmission with an OSU upon a star type optical access line in which a plurality of signals are combined and split via an optical power splitter by implementing a spectrum slicing scheme.

SUMMARY OF THE INVENTION

It is therefore an object of the present invention to provide an optical wavelength-division multiplexing (WDM) access system, and a wavelength splitter for use in such a system, which can reduce the requirement for temperature control circuitry when generating an optical signal, and moreover can connect a large number of ONUs while still allowing for standardization of such ONUs (i.e. reduction in the number of types of components required).

Furthermore, another object of the present invention is that, even in the case of a structure in which two-way communication is performed over a star type optical access line which combines and splits a plurality of signals via an optical power splitter between a number of ONUs each of which occupies a different wavelength and an OSU, along with providing an optical wavelength division multiplexing (WDM) access system which can allow for standardization of the ONUs (i.e. reduction in the number of types of components required), also to provide a concrete structure for an ONU which can be applied in such an optical wavelength-division multiplexing (WDM) access system.

The optical wavelength-division multiplexing access systems according to the first through the fourth aspects of the present invention are ones in which a center unit (OSU) and a plurality of n optical network units (ONUs) are connected via a wavelength splitter and optical fiber transmission lines, and downstream optical signals from the OSU to the respective ONUs and upstream optical signals from the respective ONUs to the OSU are transmitted in both directions, wherein: at least between the OSU and the wavelength splitter, the central wavelengths (the central frequencies) of the downstream optical signals which correspond to the ONUs are selected at will from within an equally spaced wavelength grid (an equally spaced frequency grid) which is determined by a uniform wavelength spacing of $\Delta\lambda d$ (a uniform optical frequency spacing of $\Delta fd$), and their wavelength errors (optical frequency errors) are set to be within $\pm\Delta\lambda d/2$ ($\pm\Delta fd/2$); at least between the wavelength splitter and the OSU, the central wavelengths (the central frequencies) of the upstream optical signals which correspond to the ONUs are selected at will from within an equally spaced wavelength grid (an equally spaced frequency grid) which is determined by a uniform wavelength spacing of $\Delta\lambda u$ (a uniform optical frequency spacing of $\Delta fu$), and their wavelength errors (optical frequency errors) are set to be within $\pm\Delta\lambda u/2$ ($\pm\Delta fu/2$); the wavelength spacing $\Delta\lambda d$ (the optical frequency spacing $\Delta fd$) of the downstream optical signals is set to twice or more the wavelength spacing $\Delta\lambda u$ (the optical frequency spacing $\Delta fu$) of the upstream optical signals.

Furthermore, in the optical wavelength-division multiplexing access system according to the first aspect of the present invention, each of the ONUs transmits an upstream optical signal whose optical spectral width is twice or more $\Delta\lambda u$ ($\Delta fu$), and the wavelength splitter spectrum slices the upstream signals which have been transmitted from the ONUs into wavelengths (optical frequencies) whose optical spectral widths are mutually different within $\Delta\lambda u$ ($\Delta fu$), and also wavelength-division multiplexes the spectrum-sliced signals and transmits the multiplexed signal to the OSU.

Furthermore, in the optical wavelength-division multiplexing access system according to the second aspect of the present invention, the OSU transmits an optical carrier for upstream transmission which corresponds to the wavelength spacing (the optical frequency spacing) of the upstream optical signals; the wavelength splitter demultiplexes the optical carrier for upstream transmission and supplies the demultiplexed optical carriers to the ONUs; each of the ONUs modulates the optical carrier for upstream transmission and transmits the modulated optical carrier as an upstream optical signal; and the wavelength splitter wavelength-division multiplexes the upstream optical signals which have been transmitted from the respective ONUs and transmits the multiplexed optical signal to the OSU.

Yet further, in the optical wavelength-division multiplexing access systems according to the third aspect of the present invention, the OSU transmits an optical carrier for upstream transmission of optical spectral width twice or more $\Delta\lambda u$ ($\Delta fu$); the wavelength splitter spectrum slices the optical carrier for upstream transmission into wavelengths (optical frequencies) whose optical spectral widths are mutually different within $\Delta\lambda u$ ($\Delta fu$) and supplies the spectrum-sliced optical signals to the respective ONUs; each of the ONUs modulates its optical carrier for upstream transmission of a given wavelength (of a given optical frequency) and transmits the modulated optical carrier as an upstream optical signal; and the wavelength splitter wavelength-division multiplexes the upstream optical signals which have been transmitted from the respective ONUs and transmits the multiplexed optical signal to the OSU.

Moreover, in the optical wavelength-division multiplexing access systems according to the fourth aspect of the present invention, the OSU transmits an optical carrier for upstream transmission of optical spectral width twice or more $\Delta\lambda u$ ($\Delta fu$); the wavelength splitter splits the optical carrier for upstream transmission into n and supplies the split optical carriers for upstream transmission to the ONUs; each of the ONUs modulates the split optical carrier for upstream transmission and transmits the modulated optical carrier as an upstream optical signal; and the wavelength splitter spectrum slices the upstream optical signals which have thus been transmitted from the ONUs into wavelengths (optical frequencies) whose optical spectral widths are mutually different within $\Delta\lambda u$ ($\Delta fu$), and wavelength-division multiplexes the spectrum-sliced optical signals and transmits the multiplexed optical signal to the OSU.

The wavelength splitters according to the first through the fourth aspects of the present invention are ones which are applied to the above described optical wavelength-division multiplexing access systems of the first through the fourth aspects of the present invention which have been described above.

That is to say, the wavelength splitter according to the first aspect of the present invention is one which comprises: a first input/output end; and a second input/output end, wherein: optical signals which are inputted from transmission lines upon the side of the second input/output end and whose optical spectral width is twice or more a wavelength spacing $\Delta\lambda u$ (an optical frequency spacing $\Delta fu$) are spectrum-sliced into wavelengths (optical frequencies) whose optical spectral widths are mutually different within the wavelength spacing $\Delta\lambda u$ (the optical frequency spacing $\Delta fu$), which then are wavelength-division multiplexed and are transmitted to a transmission line upon the side of the first input/output end; and a wavelength-division multiplexed optical signal which is inputted from the transmission line upon the side of the first input/output end and whose wavelength spacing $\Delta\lambda d$ (optical frequency spacing $\Delta fd$) has been set to twice or more the wavelength spacing $\Delta\lambda u$ (the optical frequency spacing $\Delta fu$) is demultiplexed and the demultiplexed optical signals are transmitted to the transmission lines upon the side of the second input/output end.

Furthermore, the wavelength splitter according to the second aspect of the present invention is one which comprises: a first input/output end; and a second input/output end, wherein: optical signals of wavelength spacing $\Delta\lambda u$ (optical frequency spacing $\Delta fu$) which are inputted from transmission lines upon the side of the second input/output end are wavelength-division multiplexed and then transmitted to a transmission line upon the side of the first input/output end; a wavelength-division multiplexed optical signal which is inputted from the transmission line upon the side of the first input/output end and which corresponds to the optical signals of wavelength spacing $\Delta\lambda u$ (optical frequency spacing $\Delta fu$) which are inputted from the transmission lines upon the side of the second input/output end is demultiplexed and then is supplied to the respective transmission lines upon the side of the second input/output end; and a wavelength-division multiplexed optical signal which is inputted from the transmission line upon the side of the first input/output end and whose wavelength spacing $\Delta\lambda d$ (optical frequency spacing $\Delta fd$) has been set to twice or more the wavelength spacing $\Delta\lambda u$ (optical frequency spacing $\Delta fu$) is demultiplexed and then is supplied to respective transmission lines upon the side of the second input/output end.

Yet further, the wavelength splitter according to the third aspect of the present invention is one which comprises: a first input/output end; and second input/output end, wherein: optical signals of wavelength spacing $\Delta\lambda u$ (optical frequency spacing $\Delta fu$) which are inputted from transmission lines upon the side of the second input/output end are wavelength-division multiplexed and then outputted to a transmission line upon the side of the first input/output end; an optical signal which is inputted from the transmission line upon the side of the first input/output end and whose optical spectral width is twice or more the wavelength spacing $\Delta\lambda u$ (optical frequency spacing $\Delta fu$) is spectrum-sliced into wavelengths (optical frequencies) whose optical spectral widths are mutually different within the wavelength spacing $\Delta\lambda u$ (the optical frequency spacing $\Delta fu$), which are then supplied to the respective transmission lines upon the side of the second input/output end; and a wavelength-division multiplexed optical signal which is inputted from the transmission line upon the side of the first input/output end and whose wavelength spacing $\Delta\lambda d$ (optical frequency spacing Δfd) has been set to twice or more the wavelength spacing Δλu (optical frequency spacing Δfu) is demultiplexed and then is supplied to the respective transmission lines upon the side of the second input/output end.

Moreover, the wavelength splitter according to the fourth aspect of the present invention is one which comprises: a first input/output end; and second input/output end, wherein: optical signals which are inputted from transmission lines upon the side of the second input/output end and whose optical spectral widths have been set to twice or more the wavelength spacing Δλu (the optical frequency spacing Δfu) are spectrum-sliced into wavelengths (optical frequencies) whose optical spectral widths are mutually different within the wavelength spacing Δλu (the optical frequency spacing Δfu), which are then wavelength-division multiplexed and are supplied to a transmission line upon the side of the first input/output end; a wavelength-division multiplexed optical signal which is inputted from the transmission line upon the side of the first input/output end and whose wavelength spacing Δλd (optical frequency spacing Δfd) has been set to twice or more the wavelength spacing Δλu (optical frequency spacing Δfu) is demultiplexed and then is supplied to the respective transmission lines upon the side of the second input/output end; and an optical signal which is inputted from a transmission line upon the side of the first input/output end and whose optical spectral width is twice or more the wavelength spacing Δλu (optical frequency spacing Δfu) is demultiplexed and then is supplied to the respective transmission lines upon the side of the second input/output end.

As has been explained above, with the optical wavelength-division multiplexing access systems according to the first through the fourth aspects of the present invention, by narrowing down the wavelength spacing of the upstream optical signals as compared with the wavelength spacing of the downstream optical signals, and moreover by arranging for the spectrum slicing to be performed by a wavelength splitter, it becomes possible to utilize components of the same specification in each of the ONUs as light sources which generate the upstream optical signals, and as optical modulators which modulate the optical carriers for upstream transmission which have been supplied from the OSU, and moreover it becomes possible to utilize components for which temperature control is not required as the light sources and the optical modulators. As a result, it becomes possible to connect a large number of ONUs.

The optical wavelength-division multiplexing access system according to the fifth aspect of the present invention is one in which a center unit (OSU) and a plurality of n optical network units (ONUS) are connected via an optical power splitter and optical fiber transmission lines, and downstream optical signals whose wavelengths mutually differ from one another from the OSU to the respective ONUs and upstream optical signals whose wavelengths mutually differ from one another from the respective ONUs to the OSU are transmitted in both directions, wherein: at least for the optical fiber transmission lines between from the respective ONUs and the OSU, the central wavelengths (the central frequencies) of the upstream optical signals which correspond to the ONUs are selected at will from within an equally spaced wavelength grid (an equally spaced frequency grid) which is determined by a uniform wavelength spacing of Δλu (a uniform optical frequency spacing of Δfu), and their wavelength errors (frequency errors) are set to be within ±Δλu/2 (±Δfu/2); and wherein each of the ONUs comprises: an optical transmitting and receiving section which comprises a wide spectrum light source section which transmits an upstream optical signal whose optical spectral width is twice or more the wavelength spacing Δλu (Δfu), and an optical receiver which receives a downstream optical signal; an electrical processing section which is connected to the optical transmitting and receiving section, and which performs predetermined electrical processing; an optical filter section which is provided at an input/output end of each the ONU upon the side of the optical fiber transmission line, and which, along with demultiplexing to the optical receiver the downstream optical signal which corresponds to each the ONU from among all the downstream optical signals which are inputted from the optical fiber transmission line, also spectrum slices the upstream optical signal which is transmitted from the wide spectrum light source section at a wavelength width (a frequency width) of within the wavelength spacing Δλu (the frequency spacing Δfu) centered upon the central wavelength (central frequency) which has been set for each the ONU, and outputs the spectrum-sliced optical signals to the optical fiber transmission line; and an optical connector which connects the optical filter section to the optical transmitting and receiving section so as to be attachable thereto and detachable therefrom.

Furthermore, the optical network unit according to the fifth aspect of the present invention is one which is applied to each of the ONUs of the fifth preferred embodiment of the optical wavelength-division multiplexing access system of the present invention which has been described above, and which comprises: a wide spectrum light source section which transmits an optical signal whose optical spectral width is of wavelength width Δλ (frequency width Δf), and an optical receiver which receives an optical signal; an electrical processing section which is connected to the optical transmitting and receiving section, and which performs predetermined electrical processing; an optical filter section which is provided at an input/output end of the optical network unit upon the side of a transmission line, and which, along with demultiplexing to the optical receiver a received optical signal which corresponds to the optical network unit from among all the optical signals which are inputted from the transmission line, also spectrum slices a transmitted optical signal which is transmitted from the wide spectrum light source section at a wavelength width (a frequency width) of less than or equal to ½ of the wavelength width Δλ (the frequency width Δf), and outputs the spectrum-sliced optical signals to the transmission line; and an optical connector which connects the optical filter section to the optical transmitting and receiving section so as to be attachable thereto and detachable therefrom.

As has been explained above, with this optical wavelength-division multiplexing access system according to the fifth aspect of the present invention, by applying a spectrum slicing scheme to an optical access system which combines and splits a plurality of signals via an optical power splitter, it is possible for each of the ONUs to implement communication with the center unit (the OSU) by occupying a different wavelength. The disclosed construction in which the ONU sections which are provided with active functions, i.e. the wide spectrum light source section, the optical receiving section, and the electrical processing section are made so as to be easily separated from their sections which are provided with passive functions corresponding to the optical filter sections, implies that it is possible to use a single type of ONU, so that it is possible to reduce the total manufacturing cost. By building the optical filter section so that it is easily attachable to and detachable from the optical transmitting and receiving section via the optical connecting section, as a result, it becomes possible to implement a system in which optical filter sections which have been assigned to each of the users are attached to ONUs which are all of the same type, so that the usability in practice is enhanced.

BRIEF DESCRIPTION OF THE DRAWINGS

FIG. 11 is a figure showing a fifth preferred embodiment of the optical WDM access system of the present invention.

FIG. 12 is a figure showing a sixth preferred embodiment of the optical WDM access system of the present invention.

DETAILED DESCRIPTION OF THE INVENTION

Figure 1:
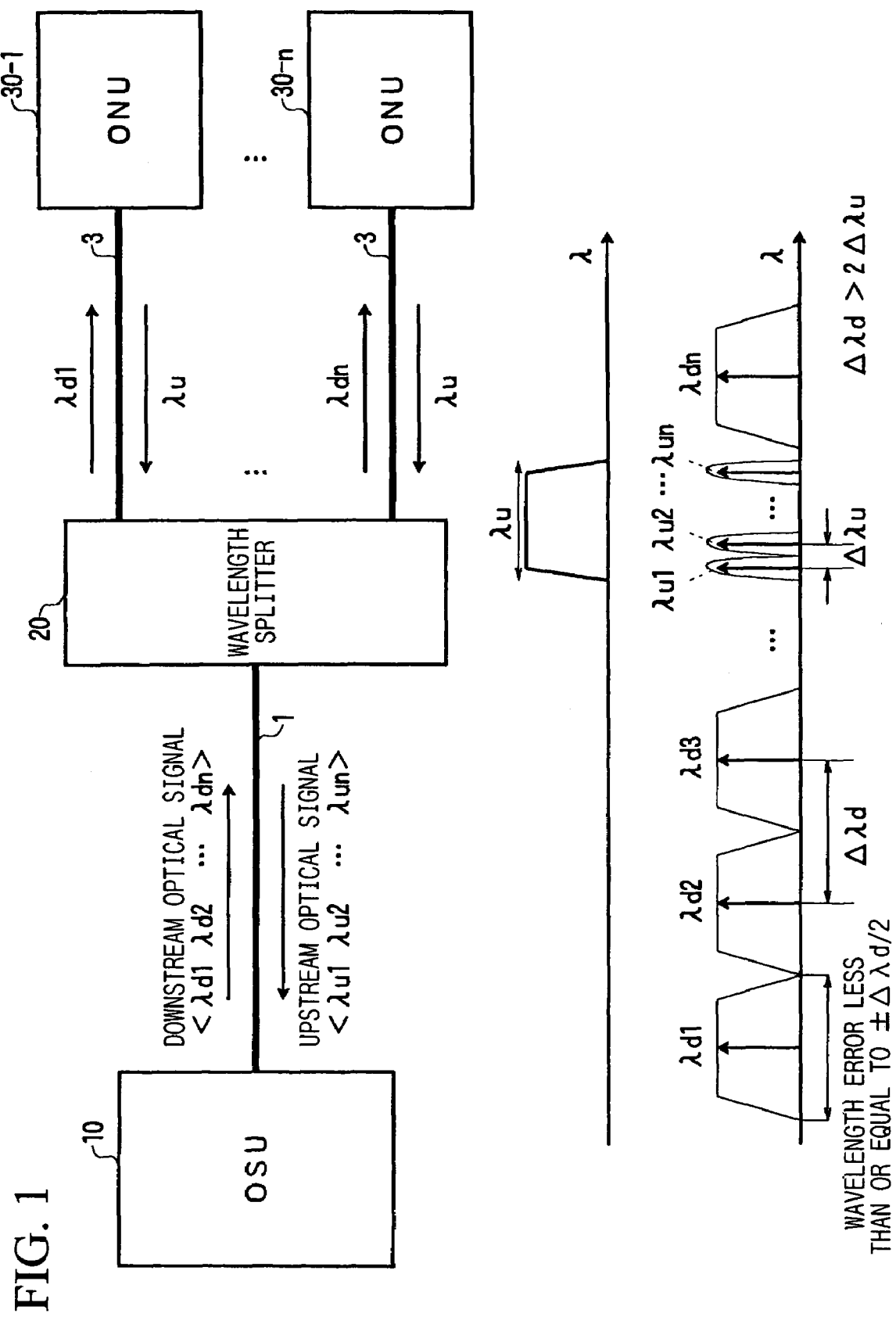
FIG. 1 is a figure showing a first preferred embodiment of the optical wavelength-division multiplexing (WDM) access system according to the present invention.

The First Preferred Embodiment of the Optical WDM Access System of the Present Invention FIG. 1 is a figure showing the first preferred embodiment of the optical wavelength-division multiplexing access system of the present invention. Referring to this figure, an OSU 10 performs wavelength-division multiplexing of downstream optical signals of wavelengths $\lambda d1$ through $\lambda dn$, and transmits the wavelength-division multiplexed signal to a wavelength splitter 20 via an optical transmission line 1. This wavelength splitter 20 demultiplexes the downstream optical signals of wavelengths $\lambda d1$ through $\lambda dn$, and forwards them to corresponding ONUs 30-1 through 30-n via optical fiber transmission lines 3.

The ONUs 30-1 through 30-n respectively receive the downstream optical signals of wavelengths $\lambda d1$ through $\lambda dn$ which have been transmitted and have arrived. Furthermore, each of the ONUs 30-1 through 30-n generates an upstream optical signal of the same wavelength band $\lambda u$, and transmits it to the wavelength splitter 20 via the optical fiber transmission line 3. The upstream signal which has been transmitted from each ONU is spectrum-sliced by the wavelength splitter 20 into the wavelengths $\lambda u1$ through $\lambda un$, which are then wavelength-division multiplexed by the wavelength splitter 20 and transmitted to the OSU 10 via the optical fiber transmission line 1.

As will be clear from the above explanation, it should be understood that the effect of the wavelength splitter 20 is not one which is limited to "splitting"; it not only performs splitting, but, when propagating an optical signal in the reverse direction, it functions as a combiner. In other words, although the wavelength splitter 20 functions as both a wavelength splitter and a combiner, for the sake of convenience, it will simply be termed a "wavelength splitter".

Furthermore, as will be described in detail hereinafter with reference to FIGS. 2 through 5, with the optical wavelength-division multiplexing access system of this first preferred embodiment of the present invention, a single optical fiber transmission line is connected between the OSU 10 and the wavelength splitter 20, while a total of n single or double optical fiber transmission lines are connected between the wavelength splitter 20 and the n ONUs 30-1 through 30-n.

Each of the downstream optical signals of wavelengths $\lambda d1$ through $\lambda dn$ is selected at will from among an equally spaced wavelength grid (an equally spaced frequency grid) which is determined at a uniform wavelength spacing of $\Delta \lambda d$ (an optical frequency spacing of $\Delta fd$), and its wavelength error (its optical frequency error) is within $\pm\Delta\lambda d/2$ ($\pm\Delta fd/2$). Furthermore, each of the upstream optical signals of wavelengths $\lambda u1$ through $\lambda un$ is selected at will from among an equally spaced wavelength grid (an equally spaced frequency grid) which is determined at a uniform wavelength spacing of $\Delta\lambda u$ (an optical frequency spacing of $\Delta fu$), and its wavelength error (its optical frequency error) is within $\pm\Delta\lambda u/2$ ($\pm\Delta fu/2$).

Here, the distinguishing feature of the present invention is that the wavelength spacing $\Delta\lambda d$ (the optical frequency spacing $\Delta fd$) of the downstream optical signals is set to be twice or more the wavelength spacing $\Delta\lambda u$ (the optical frequency spacing $\Delta fu$) of the upstream optical signals. In other words, as compared with the band of the downstream optical signals of wavelengths $\lambda d1$ through $\lambda dn$, the band of the upstream optical signals of wavelengths $\lambda u1$ through $\lambda un$ is narrower, and, for example, is set so that all the channels of the upstream optical signals of wavelengths $\lambda u1$ through $\lambda un$ are within the wavelength band of a single channel of the downstream optical signal. Since, by narrowing down the wavelength spacing of the upstream optical signals in this manner, it is possible to utilize in each of the ONUs a device of an identical specification for the light source which generates the upstream optical signal, accordingly it is possible to connect a large number of ONUs to the system. In the following, this will be explained in terms of a concrete example.

Each of the downstream optical signals of wavelengths $\lambda d1$ through $\lambda dn$ which are propagated along the optical fiber transmission line 1 is selected at will from among, for example, an equally spaced wavelength grid of 1270±20 n (nm) having a wavelength spacing $\Delta\lambda d=20$ nm (which is specified as n=0 through n=17 according to the ITU-T G.694.2 standard). If the wavelength error is taken as, for example, ±6~7 nm, then, a DFB laser can be used in a range of ±35° C.

On the other hand, when the optical spectral width of the upstream optical signals which are transmitted from the ONUs 30-1 through 30-n is taken as, for example, 11.2 nm in the wavelength range of 1544.5~1555.7 nm, then it is possible to obtain eight upstream optical signals from 194, 100 GHz (=1544.5 nm) to 192,700 GHz (=1555.7 nm)±100 GHz by spectrum slicing with the wavelength splitter 20 at, for example, an optical spectral width of 200 GHz (about 1.6 nm in the vicinity of 1550 nm). In other words, it is possible to perform wavelength-division multiplexing (WDM) of eight upstream optical signals from eight ONUs.

Furthermore, if the optical spectral width of the upstream optical signals which are transmitted from the ONUs 30-1 through 30-n is taken as, for example, 16.0 nm in the wavelength range 1299.5~1315.5 nm, then it is possible to obtain eight upstream optical signals from 230,700 GHz (=1299.5 nm) to 227,900 GHz (=1315.5 nm) ±200 GHz by spectrum slicing with the wavelength splitter 20 at, for example, an optical spectral width of 400 GHz (about 2.3 nm in the vicinity of 1300 nm). In other words, it is possible to perform wavelength-division multiplexing (WDM) of eight upstream optical signals from eight ONUs. It should be understood that the wavelengths of the downstream optical signals at this time are eight wavelengths, for example, at 20 nm spacings in the range from 1450~1590 nm ±6~7 nm.

Since the upstream optical signals of this type having minimum optical spectral width of about 11.2 nm or 16.0 nm may be generated using light sources such as a super-luminescent diodes, semiconductor optical amplifiers, or erbium-doped optical fiber amplifiers or the like, it will be understood that it is possible to provide eight such ONUs, as in the above example, utilizing components of the same specification.

In this connection, with this first preferred embodiment, since the spectrum slicing is only applied to transmission of the upstream optical signals, the transmission schemes of upstream transmission and downstream transmission come to be different, and accordingly there is a possibility that the bit rates which can be transmitted upstream and downstream may be different. Even in this case, it is possible to provide interfaces to the OSU and to the ONUs which have the same bit rates (see the above-mentioned Patent Reference #4). For example, if it is not possible to attain a bit rate for the upstream optical signals of greater than a few hundreds of Mbit/sec by using spectrum slicing, it is possible to provide Gigabit Ethernet (this is a registered trademark) interfaces to the OSU and to the ONUs, and to set the bit rate for the downstream optical signals to 1.25 Gbit/sec (the normal transmission rate for Gigabit Ethernet (registered trademark)), while setting the bit rate for the upstream optical signals to 125 Mbit/sec.

Figure 2:
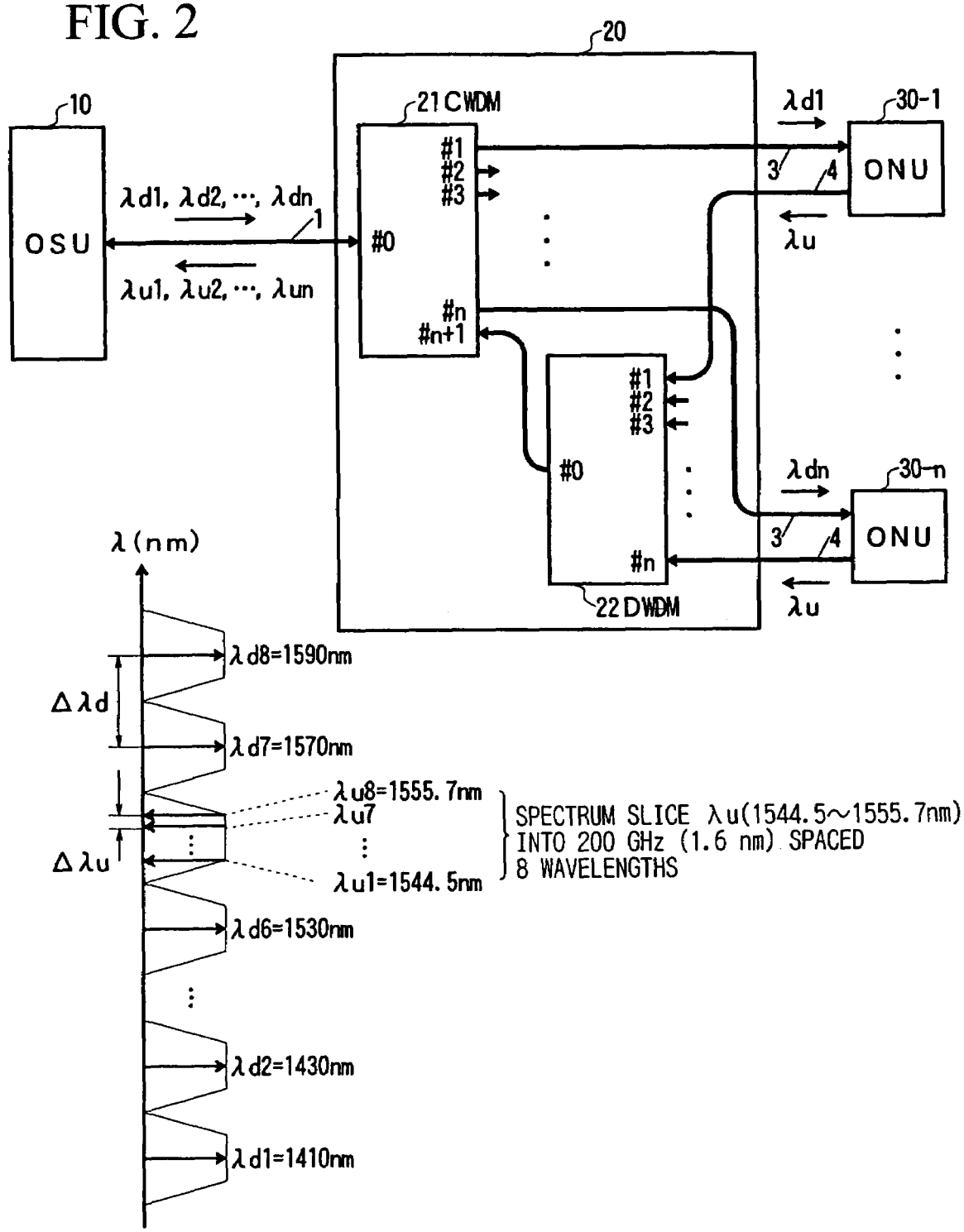
FIG. 2 is a figure showing a first structural example of a wavelength splitter 20 of this first preferred embodiment.

The First Structural Example of the Wavelength Splitter 20 of the First Preferred Embodiment FIG. 2 is a figure showing a first structural example of the wavelength splitter 20 of the first preferred embodiment of the optical wavelength-division multiplexing access system according to the present invention.

Referring to this figure, the wavelength splitter 20 comprises a CWDM (Coarse Wavelength-Division Multiplexing) coupler 21 which has a single combine port and (n+1) split ports, and which demultiplexes into wavelength regions (optical frequency regions) which take (n+1) central wavelengths (optical frequencies) which are selected from among an equally spaced wavelength grid (an equally spaced frequency grid) which is defined by a uniform wavelength spacing of $\Delta\lambda d$ (a uniform optical frequency spacing $\Delta fd$) within a transmission width of $\pm\Delta\lambda d/2$ ($\pm\Delta fd/2$), and a DWDM (Dense Wavelength-Division Multiplexing) coupler 22 which has a single combine port and n split ports, and which demultiplexes into wavelength regions (optical frequency regions) which take n central wavelengths (optical frequencies) which are selected from among an equally spaced wavelength grid (an equally spaced frequency grid) which is defined by a uniform wavelength spacing of $\Delta\lambda u$ (a uniform optical frequency spacing $\Delta fu$) within a transmission width of $\pm\Delta\lambda u/2$ ($\pm\Delta fu/2$).

It should be understood that, when the optical signals have been inputted into the split ports #1 through #n of the DWDM coupler 22, the DWDM coupler 22 spectrum slices these optical signals which have been inputted, it wavelength-division multiplexes the optical signals which have been spectrum-sliced and outputs them from its combine port #0. This is the same as in the case of the DWDM couplers 24-1, 24-2 which will be described hereinafter.

The combine port #0 of the CWDM coupler 21 is connected to the OSU 10 via an optical fiber transmission line 1. The n split ports #1 through #n of the CWDM coupler 21 are connected to the ONUs 30-1 through 30-n via optical fiber transmission lines 3. The split port #(n+1) of the CWDM coupler 21 is connected to the combine port #0 of the DWDM coupler 22. The n split ports #1 through #n of the DWDM coupler 22 are connected to the ONUs 30-1 through 30-n via optical fiber transmission lines 4.

The downstream optical signals of wavelengths $\lambda d1$ through $\lambda dn$ which are inputted to the combine port #0 of the CWDM coupler 21 are split to the split ports #1 through #n, and are respectively transmitted to their corresponding ONUs 30-1 through 30-n via the optical fiber transmission lines 3. The upstream optical signals of wavelengths $\lambda u$ which are inputted to the split ports #1 through #n of the DWDM coupler 22 from the ONUs 30-1 through 30-n are spectrum-sliced into wavelengths $\lambda u1$ through $\lambda un$ and are wavelength-division multiplexed and the multiplexed signal is outputted from its combine port #0. These n upstream optical signals are inputted to the split port #(n+1) of the CWDM coupler 21, and these n upstream optical signals are handled equally with the single downstream optical signal, and are transmitted from the combine port #0 of the CWDM coupler 21. FIG. 2 shows a concrete example of wavelength assignment in the case of n=8.

Here, the CWDM coupler 21 may be implemented as a multi port wavelength filter in which wavelength filters (for example dielectric multilayer filters) which transmit (or reflect) respective different wavelengths while they reflect (or transmit) other wavelengths are connected in multiple stages, or may be implemented as an array waveguide grating (AWG) filter which has been built as a planar optical circuit upon a glass substrate. The DWDM coupler 22 may be implemented as a multi port wavelength filter or an AWG filter which has a different wavelength spacing from that of the CWDM coupler 21.

Figure 3:
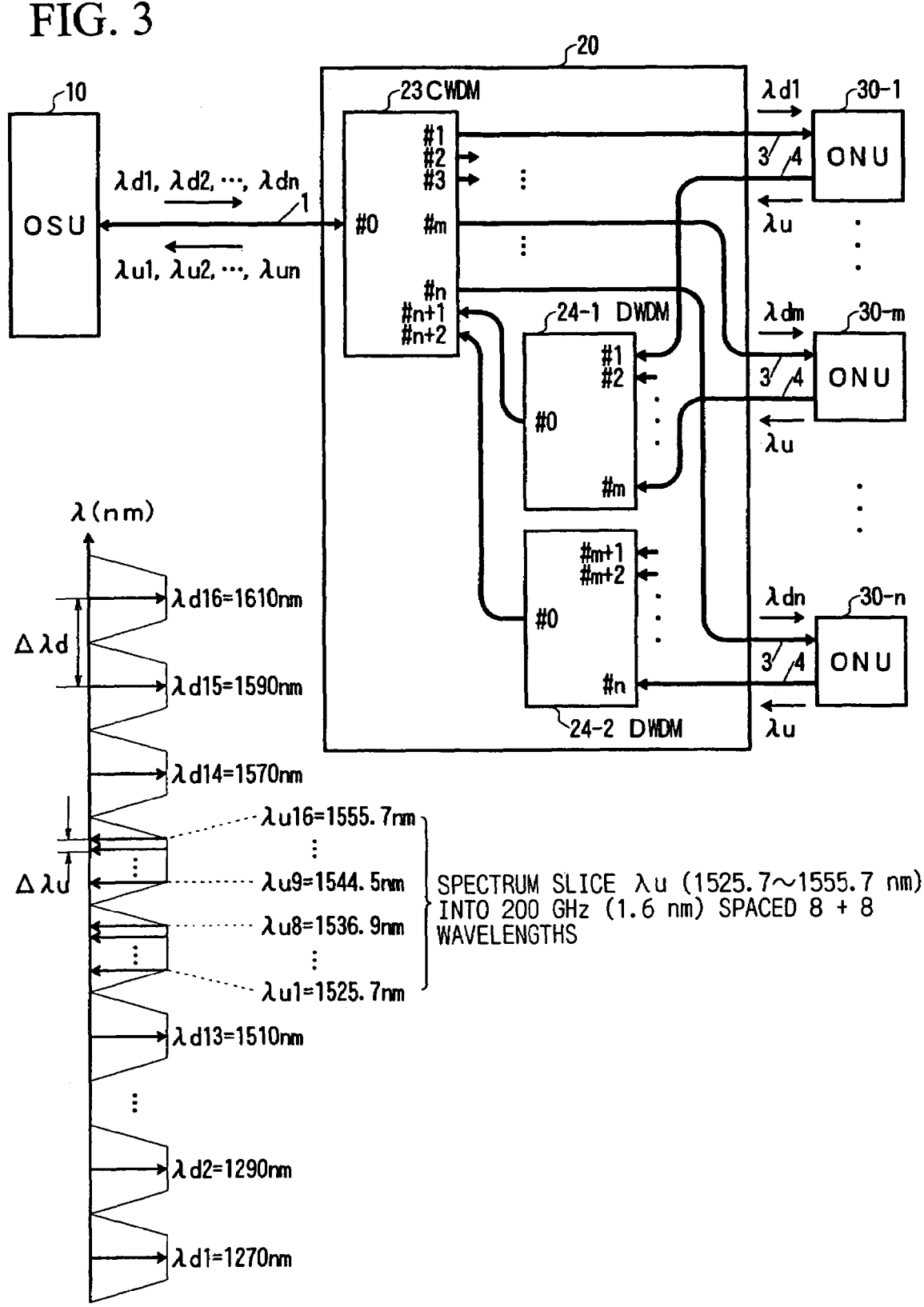
FIG. 3 is a figure showing a second structural example of the wavelength splitter 20 of the first preferred embodiment.

The Second Structural Example of the Wavelength Splitter 20 of the First Preferred Embodiment FIG. 3 is a figure showing a second structural example of the wavelength splitter 20 of the first preferred embodiment of the optical wavelength-division multiplexing access system according to the present invention.

Referring to this figure, the wavelength splitter 20 comprises a CWDM coupler 23 which has a single combine port and (n+2) split ports, and which demultiplexes into wavelength regions (optical frequency regions) which take (n+2) central wavelengths (optical frequencies) which are selected from among an equally spaced wavelength grid (an equally spaced frequency grid) which is defined by a uniform wavelength spacing of $\Delta\lambda d$ (a uniform optical frequency spacing $\Delta fd$) within a transmission width $\pm\Delta\lambda d/2$ ($\pm\Delta fd/2$), a DWDM coupler 24-1 which has a single combine port and m split ports, and which demultiplexes into wavelength regions (optical frequency regions) which take m central wavelengths (optical frequencies) which are selected from among an equally spaced wavelength grid (an equally spaced frequency grid) which is defined by a uniform wavelength spacing of $\Delta\lambda u$ (a uniform optical frequency spacing $\Delta fu$) within a transmission width $\pm\Delta\lambda u/2$ ($\pm\Delta fu/2$), and a similar DWDM coupler 24-2 which has a single combine port and (n–m) split ports.

The combine port #0 of the CWDM coupler 23 is connected to the OSU 10 via an optical fiber transmission line 1. The n split ports #1 through #n of the CWDM coupler 23 are connected to the ONUs 30-1 through 30-n via optical fiber transmission lines 3. The split ports #(n+1) and #(n+2) of the CWDM coupler 23 are connected to the combine ports #0 of the DWDM couplers 24-1 and 24-2 respectively. The m split ports #1 through #m of the DWDM coupler 24-1 and the (n–m) split ports #(m+1) through #n of the DWDM coupler 24-2 are respectively connected to the ONUs 30-1 through 30-n. via the optical fiber transmission lines 4.

The downstream optical signals of wavelengths $\lambda d1$ through $\lambda dn$ which are inputted to the combine port of the CWDM coupler 23 are split to the split ports #1 through #n, and are respectively transmitted to their corresponding ONUs 30-1 through 30-n via the optical fiber transmission lines 3. The upstream optical signals of wavelengths $\lambda u$ which are inputted to the split ports #1 through #m of the DWDM coupler 24-1 from the ONUs 30-1 through 30-m are spectrum-sliced into wavelengths $\lambda u1$ through $\lambda um$ and are wavelength-division multiplexed and are outputted from its combine port #0. Moreover, the upstream optical signals of wavelengths $\lambda u$ which are inputted to the split ports #(m+1) through #n of the DWDM coupler 24-2 from the ONUs 30-(m+1) through 30-n are spectrum-sliced into wavelengths $\lambda u$ (m+1) through $\lambda un$ and are wavelength-division multiplexed and are outputted from its combine port #0. These m and (n–m) upstream optical signals are inputted to the split ports #(n+1) and #(n+2) of the CWDM coupler 23, and these m and (n–m) upstream optical signals are handled in the same manner as the two downstream optical signals, and are transmitted from the combine port #0 of the CWDM coupler 23. FIG. 3 shows a concrete example of wavelength assignment in the case of n=16 and m=8.

In this second structural example, when taken as 30 nm in the wavelength range of 1525.7~1555.7 nm, the optical spectral widths of the upstream optical signals which are transmitted from the ONUs 30-1 through 30-n are divided into two groups, and 16 upstream optical signals from 196,500 GHz (=1525.7 nm) to 192,700 GHz (=1555.7 nm)±100 GHz are obtained by spectrum slicing at the optical spectral width of 200 GHz (about 1.6 nm in the vicinity of 1550 nm) by the DWDMs 24-1 and 24-2.

Figure 4:
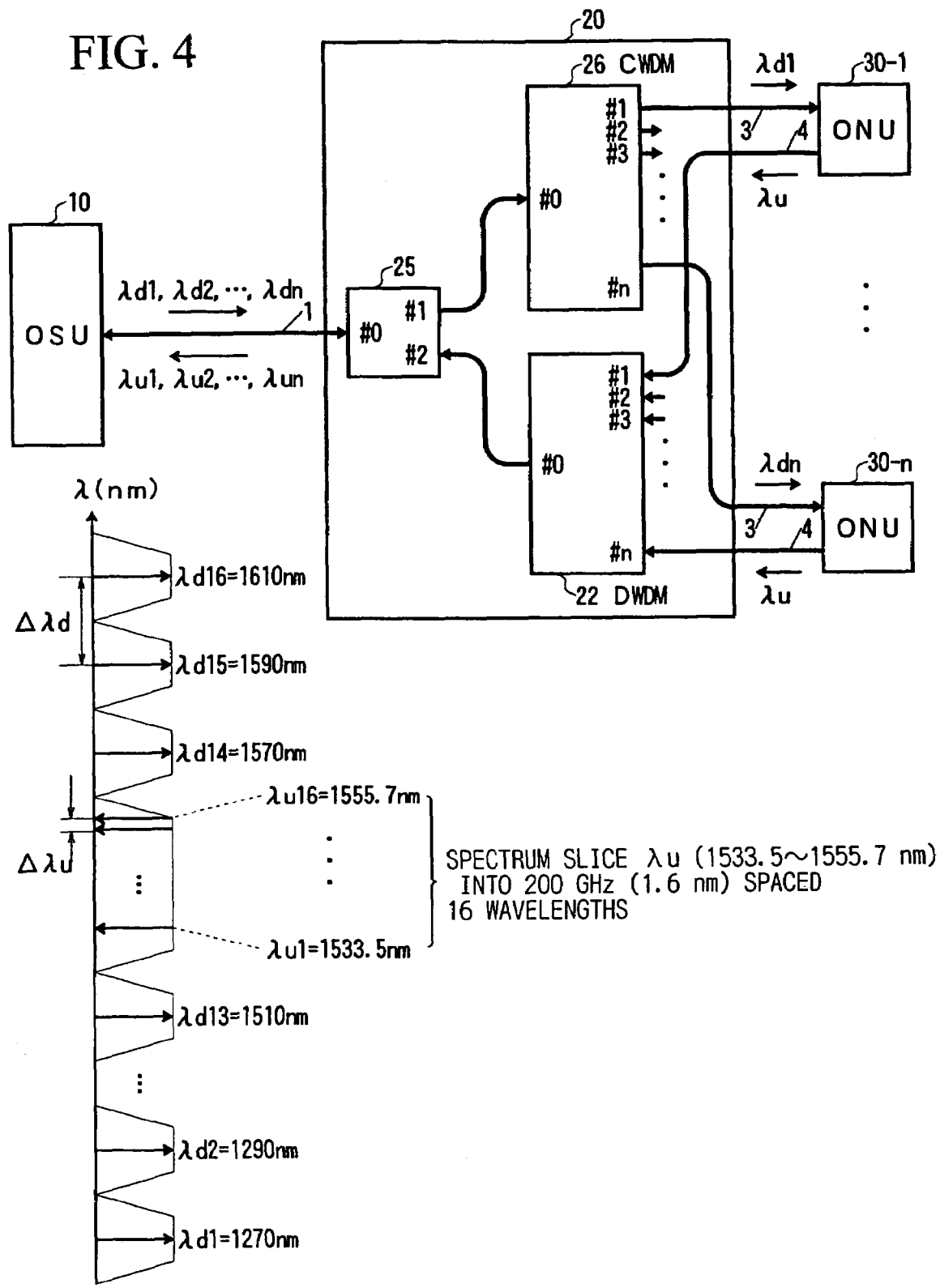
FIG. 4 is a figure showing a third structural example of the wavelength splitter 20 of the first preferred embodiment.

The Third Structural Example of the Wavelength Splitter 20 of the First Preferred Embodiment FIG. 4 is a figure showing a third structural example of the wavelength splitter 20 of the first preferred embodiment of the optical wavelength-division multiplexing access system according to the present invention.

Referring to this figure, the wavelength splitter 20 comprises: a WDM coupler 25 which has a single combine port and two split ports, and which splits and combines downstream optical signals of wavelengths $\lambda d1$ through $\lambda dn$ and upstream optical signals of wavelengths $\lambda u1$ through $\lambda un$; a CWDM coupler 26 which has a single combine port and n split ports, and which demultiplexes into wavelength regions (optical frequency regions) which take n central wavelengths (optical frequencies) which are selected from among an equally spaced wavelength grid (an equally spaced frequency grid) which is defined by a uniform wavelength spacing of $\Delta\lambda d$ (a uniform optical frequency spacing $\Delta fd$) within a transmission width of $\pm\Delta\lambda d/2$ ($\pm\Delta fd/2$); and a DWDM coupler 22 which has a single combine port and n split ports, and which demultiplexes into wavelength regions (optical frequency regions) which take n central wavelengths (optical frequencies) which are selected from among an equally spaced wavelength grid (an equally spaced frequency grid) which is defined by a uniform wavelength spacing of $\Delta\lambda u$ (a uniform optical frequency spacing $\Delta fu$) within a transmission width of $\pm\Delta\lambda u/2$ ($\pm\Delta fu/2$).

The combine port #0 of the WDM coupler 25 is connected to the OSU 10 via an optical fiber transmission line 1. The two split ports #1 and #2 of the WDM coupler 25 are connected to the combine ports #0 of the CWDM coupler 26 and of the DWDM coupler 22. The n split ports #1 through #n of the CWDM coupler 26 are connected to the ONUs 30-1 through 30-n via optical fiber transmission lines 3. The n split ports #1 through #n of the DWDM coupler 22 are connected to the ONUs 30-1 through 30-n via optical fiber transmission lines 4.

The downstream optical signals of wavelengths $\lambda d1$ through $\lambda dn$ which are inputted to the combine port #0 of the WDM coupler 25 are split to the split port #1, further are inputted to the combine port #0 of the CWDM coupler 26 and are split to its split ports #1 through #n, and are then respectively transmitted to their corresponding ONUs 30-1 through 30-n via the optical fiber transmission lines 3. The upstream optical signals of wavelengths $\lambda u$ which are inputted to the split ports #1 through #n of the DWDM coupler 22 from the ONUs 30-1 through 30-n are spectrum-sliced into wavelengths $\lambda u1$ through $\lambda un$ and are wavelength-division multiplexed and are outputted from its combine port #0. These n upstream optical signals are inputted to the split port #2 of the WDM coupler 25, and are transmitted from its combine port #0. FIG. 4 shows a concrete example of wavelength assignment in the case of n=16.

Figure 5:
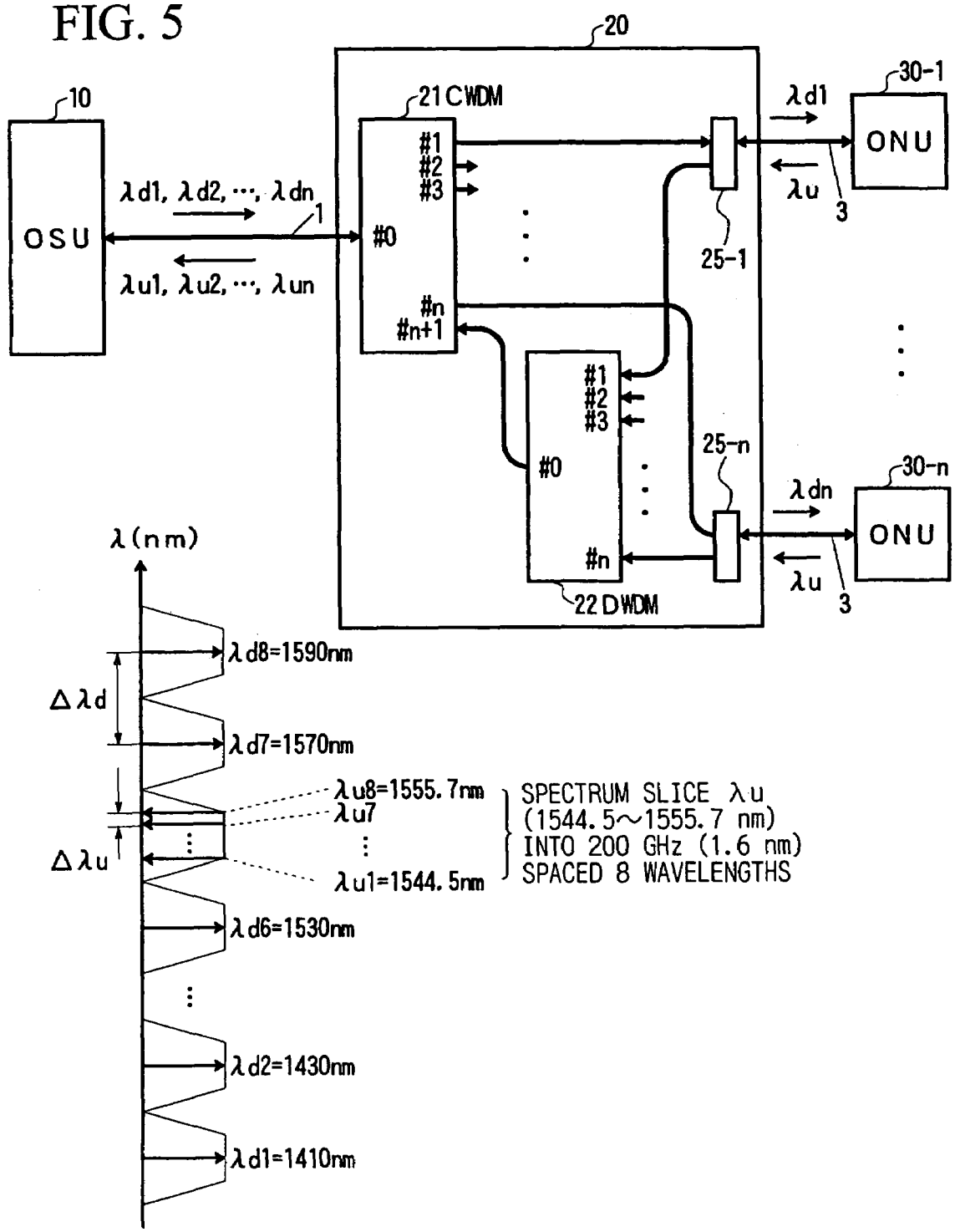
FIG. 5 is a figure showing a fourth structural example of the wavelength splitter 20 of the first preferred embodiment.

The Fourth Structural Example of the Wavelength Splitter 20 of the First Preferred Embodiment FIG. 5 is a figure showing a fourth structural example of the wavelength splitter 20 of the first preferred embodiment of the optical wavelength-division multiplexing access system according to the present invention.

In the first structural example shown in FIG. 2, two optical fiber transmission lines 3 and 4 were utilized for connecting between the wavelength splitter 20 and each of the ONUs 30-1 through 30-n. By contrast, in this fourth structural example, a total of n WDM couplers 25-1 through 25-n are employed for splitting the downstream optical signals of wavelengths $\lambda d1$ through $\lambda dn$ and the upstream optical signals of wavelengths $\lambda u$, and the split ports #1 through #n of the CWDM coupler 21 and the split ports #1 through #n of the DWDM coupler 22 are connected to the respective WDM couplers 25-1 through 25-n respectively, so that each of the ONUs 30-1 through 30-n is connected to the corresponding WDM coupler via a single optical fiber transmission line 3.

Here, although this modification is shown as being applied to the first structural example shown in FIG. 2, it could also be applied in the same manner to the second structural example shown in FIG. 3 or to the third structural example shown in FIG. 4, in an analogous manner.

Figure 6:
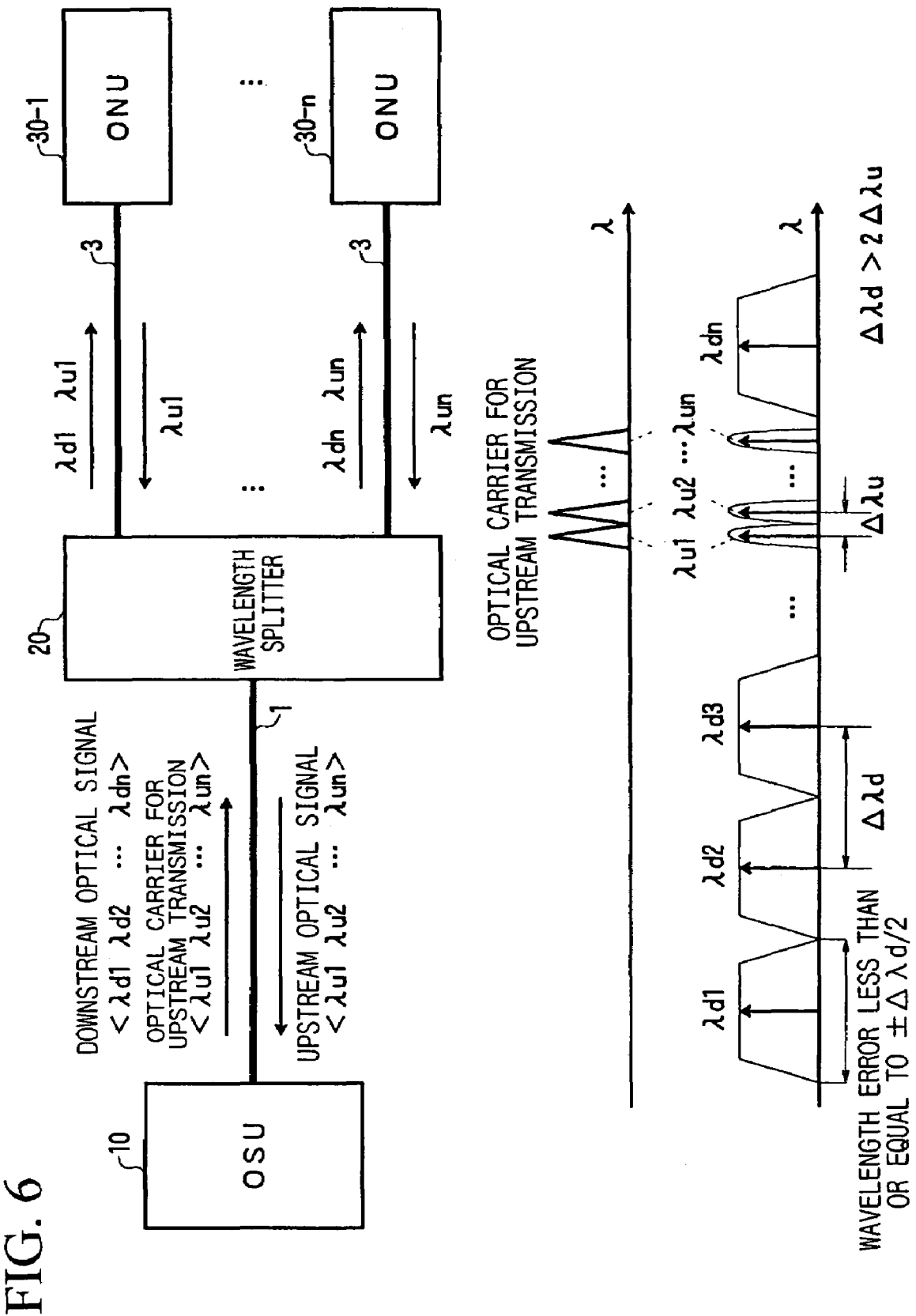
FIG. 6 is a figure showing a second preferred embodiment of the optical WDM access system of the present invention.

The Second Through Fourth Preferred Embodiments of the Optical WDM Access System of the Present Invention FIG. 6 is a figure showing the second preferred embodiment of the optical wavelength-division multiplexing access system according to the present invention. Referring to this figure, the OSU 10 wavelength-division multiplexes downstream optical signals of wavelengths $\lambda d1$ through $\lambda dn$ and an optical carrier for upstream transmission of wavelength $\lambda u1$ through $\lambda un$, and transmits them via an optical fiber transmission line 1 to a wavelength splitter 20. The wavelength splitter 20 multiplexes the downstream optical signals of wavelengths $\lambda d1$ through $\lambda dn$ and the optical carrier for upstream transmission of wavelength $\lambda u1$ through $\lambda un$, and transmits them via optical fiber transmission lines 3 to respectively corresponding ONUs 30-1 through 30-n.

The ONUs 30-1 through 30-n receive the respective downstream optical signals of wavelengths $\lambda d1$ through $\lambda dn$ which have been transmitted and have arrived. Furthermore, they multiplex the optical carrier for upstream transmission of wavelength $\lambda u1$ through $\lambda un$ from each of these downstream optical signals, modulate it, and return it back as an upstream optical signal, each transmitting it via its corresponding optical fiber transmission line 3 to the wavelength splitter 20. These upstream optical signals of wavelengths $\lambda u1$ through $\lambda un$ which have been transmitted from the ONUs 30-1 through 30-n are wavelength-division multiplexed by the wavelength splitter 20, and are transmitted to the OSU 10 via the optical fiber transmission line 1.

In this second preferred embodiment, the ONUs 30-1 through 30-n are distinguished by being built so that the optical carriers for upstream transmission of wavelengths $\lambda u1$ through $\lambda un$ which have been supplied from the OSU 10 are respectively modulated and returned back, but in other respects their construction is the same as that which was employed for the first preferred embodiment described above. In other words, the wavelength spacing $\Delta\lambda d$ (the optical frequency spacing $\Delta fd$) of the downstream optical signals is set to be twice or more the wavelength spacing $\Delta\lambda u$ (the optical frequency spacing $\Delta fu$) of the upstream optical signals, so that, by thus narrowing down the wavelength spacing of the upstream optical signals, it is possible in each ONU to utilize a component of the same specification as the optical modulator which modulates the upstream optical signal.

Figure 7:
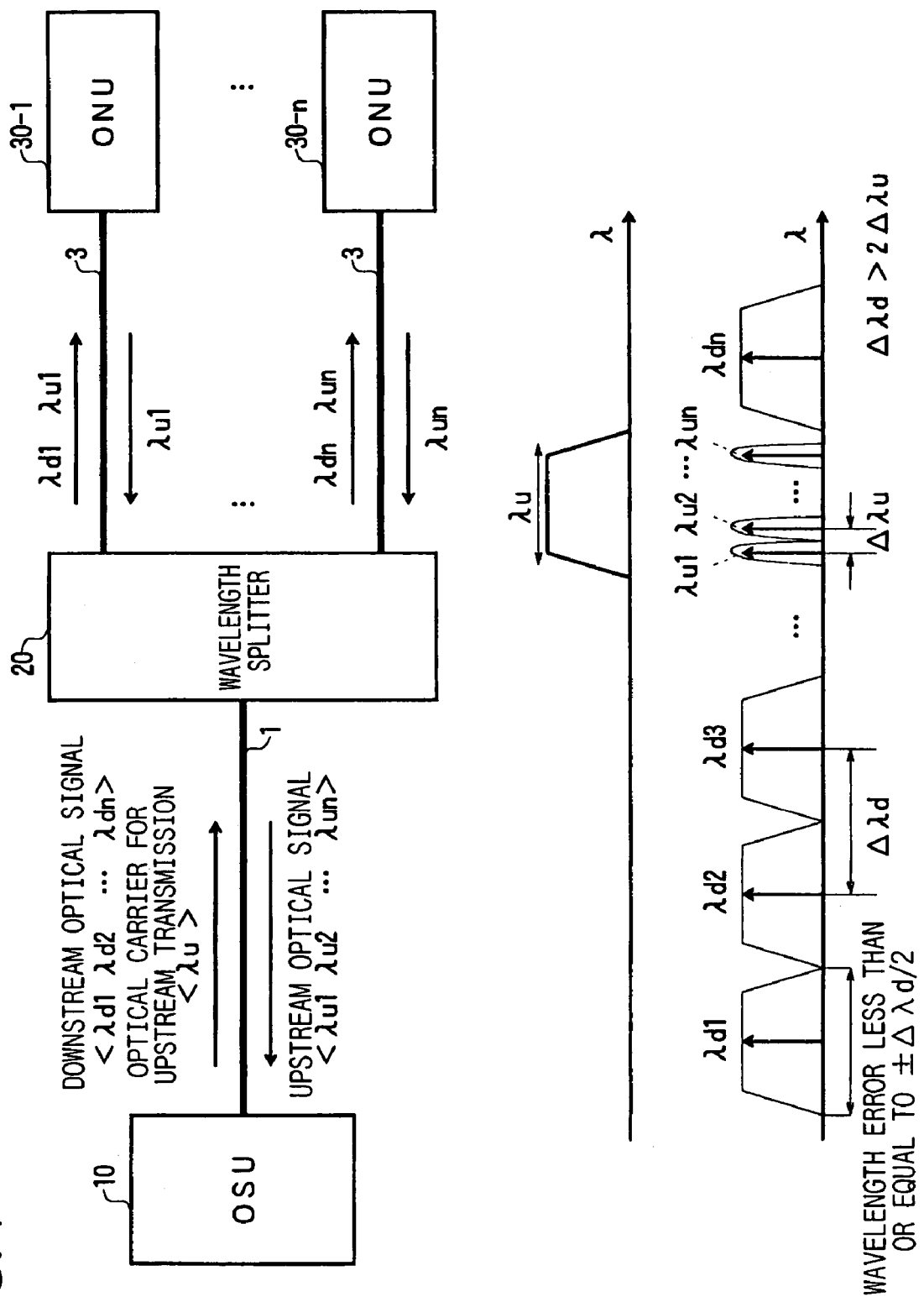
FIG. 7 is a figure showing a third preferred embodiment of the optical WDM access system of the present invention.

It should be understood that it would also be acceptable, as in the third preferred embodiment which is shown in FIG. 7, to arrange for the optical carrier for upstream transmission which is transmitted from the OSU 10 to be broadband light of wavelength $\lambda u$ which includes the wavelengths $\lambda u1$ through $\lambda un$, and to provide a structure such that this broadband light is spectrum-sliced by the wavelength splitter 20 into the optical carriers for upstream transmission of wavelengths $\lambda u1$ through $\lambda un$, which are then supplied to each of the ONUs.

Figure 8:
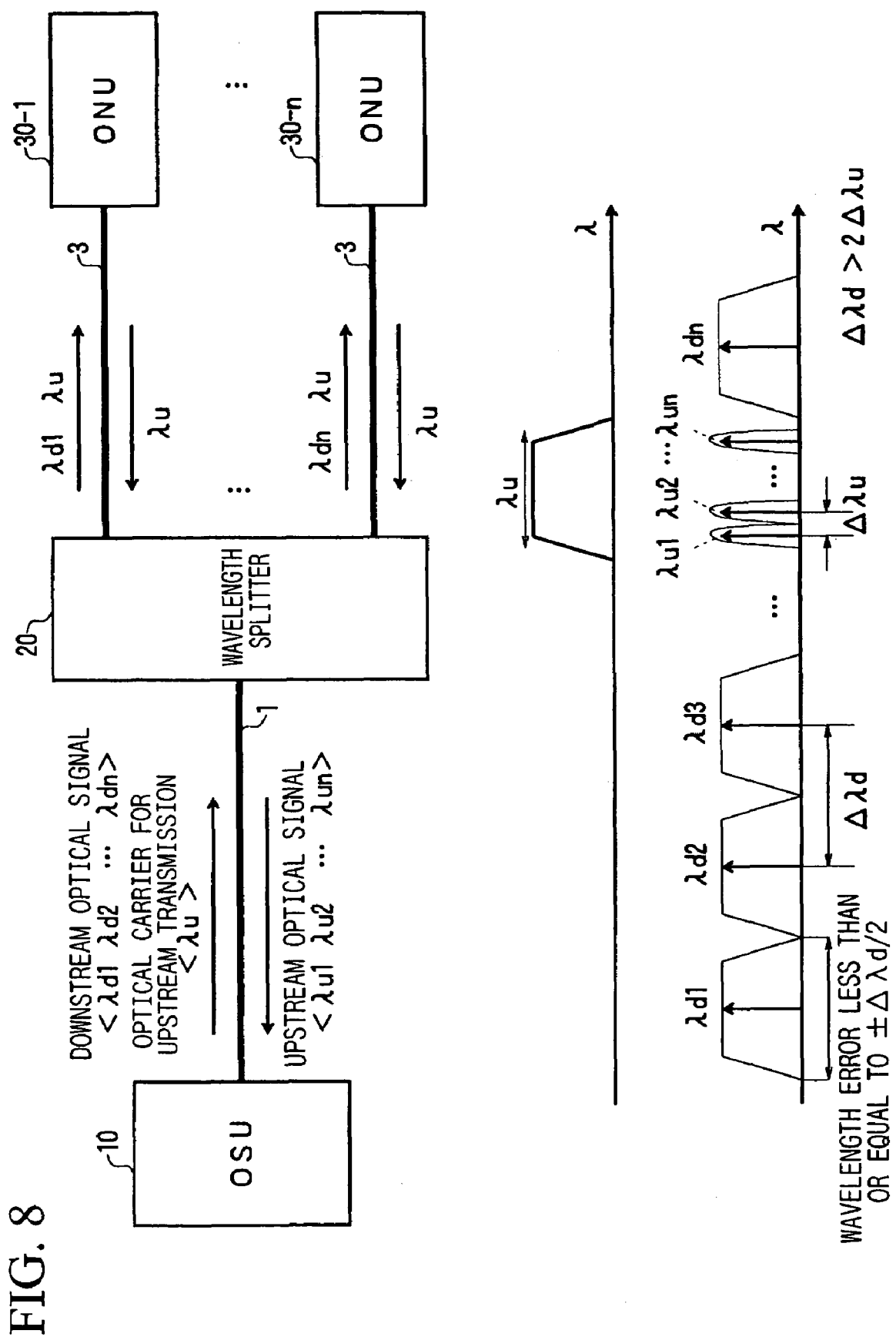
FIG. 8 is a figure showing a fourth preferred embodiment of the optical WDM access system of the present invention.

Furthermore, it should be understood that it would also be acceptable, as in the fourth preferred embodiment which is shown in FIG. 8, to arrange for the optical carrier for upstream transmission which is transmitted from the OSU 10 to be broadband light of wavelength $\lambda u$ which includes the wavelengths $\lambda u1$ through $\lambda un$, and to provide a structure such that the wavelength splitter 20 splits this optical carrier for upstream transmission of the wavelength $\lambda u$ and outputs to each of the ONUs without spectrum slicing this optical carrier for upstream transmission, so that, instead, each of the ONUs modulates this optical carrier for upstream transmission of the wavelength $\lambda u$ and returns it back to the wavelength splitter 20, and the wavelength splitter then spectrum slices it into upstream signals of wavelengths $\lambda u1$ through $\lambda un$ and wavelength-division multiplexes them, finally outputting them to the OSU 10.

With a structure of this type in which a broadband optical carrier for upstream transmission is supplied from the OSU 10 to each of the ONUs in this manner, it is possible to provide either one of a structure in which the optical carrier for upstream transmission which has been spectrum-sliced in the downstream direction is supplied to each of the ONUs, or a structure in which an upstream optical signal which has been transmitted in the upstream direction from each of the ONUs is spectrum-sliced and wavelength-division multiplexed.

It should be understood that, as is described hereinafter with reference to FIGS. 9 and 10, in the optical wavelength-division multiplexing access systems of the second through the fourth preferred embodiments of the present invention, along with connecting double optical fiber transmission lines between the OSU 10 and the wavelength splitter 20, double optical fiber transmission lines are connected between the wavelength splitter 20 and each of the n ONUs 30-1 through 30-n.

Figure 9:
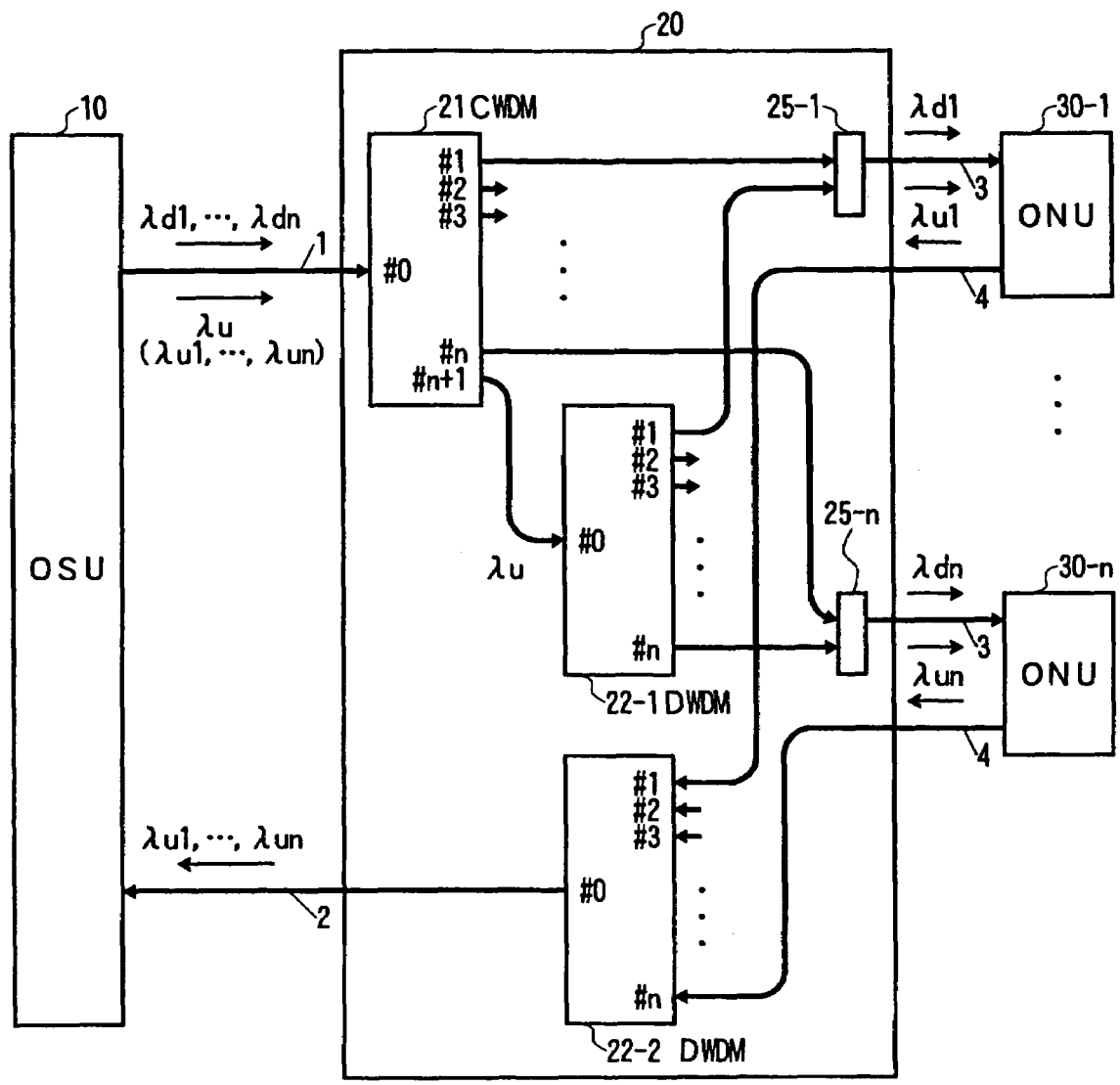
FIG. 9 is a figure showing a first structural example of a wavelength splitter 20 of these second through fourth preferred embodiments.

The First Structural Example of the Wavelength Splitter 20 of the Second Through Fourth Preferred Embodiments FIG. 9 is a figure showing a first structural example of a wavelength splitter 20 which is incorporated in the second through the fourth preferred embodiments of the optical wavelength-division multiplexing access system according to the present invention.

Referring to this figure, the wavelength splitter 20 comprises: a CWDM coupler 21 which has a single combine port and (n+1) split ports, and which demultiplexes into wavelength regions (optical frequency regions) which take as (n+1) central wavelengths (optical frequencies) which are selected from among an equally spaced wavelength grid (an equally spaced frequency grid) which is defined by a uniform wavelength spacing $\Delta\lambda d$ (a uniform optical frequency spacing $\Delta fd$) within a transmission width of $\pm\Delta\lambda d/2$ ($\pm\Delta fd/2$); two DWDM couplers 22-1 and 22-2, each of which has a single combine port and n split ports, and which demultiplexes into wavelength regions (optical frequency regions) which take n central wavelengths (optical frequencies) which are selected from among an equally spaced wavelength grid (an equally spaced frequency grid) which is defined by a uniform wavelength spacing $\Delta\lambda u$ (a uniform optical frequency spacing $\Delta fu$) within a transmission width $\pm\Delta\lambda u/2$ ($\pm\Delta fu/2$); and WDM couplers 25-1 through 25-n, which combine respective downstream optical signals of wavelengths $\lambda d1$ through $\lambda dn$ and respective optical carriers for upstream transmission of wavelengths $\lambda u1$ through $\lambda un$.

It should be understood that, if optical signals are inputted into the split ports #1 through #n of the DWDM coupler 22-1 or 22-2, the DWDM coupler 22-1 or 22-2 wavelength-division multiplexes these optical signals which have been inputted and outputs the multiplexed signal from its combine port #0.

The combine port #0 of the CWDM coupler 21 is connected to the OSU 10 via an optical fiber transmission line 1. The n split ports #1 through #n of the CWDM coupler 21 are connected to the WDM couplers 25-1 through 25-n respectively, and thence via optical fiber transmission lines 3 to the ONUs 30-1 through 30-n respectively. The split port

(n+1) of the CWDM coupler 21 is connected to the combine port #0 of the DWDM coupler 22-1. The n split ports #1 through #n of the DWDM coupler 22-1 are connected to the WDM couplers 25-1 through 25-n respectively, and thence via the optical fiber transmission lines 3 to the ONUs 30-1 through 30-n respectively. The n split ports #1 through #n of the DWDM coupler 22-2 are connected via optical fiber transmission lines 4 to the ONUs 30-1 through 30-n respectively. Finally, the combine port #0 of the DWDM coupler 22-2 is connected to the OSU 10 via an optical fiber transmission line 2.

The downstream optical signals of wavelengths λd1 through λdn which are inputted to the combine port #0 of the CWDM coupler 21 are split to its split ports #1 through #n, and are transmitted to the corresponding ONUs 30-1 through 30-n via the WDM couplers 25-1 through 25-n respectively and via the respective optical fiber transmission lines 3. Furthermore, the optical carrier for upstream transmission of wavelength λu is split to the split port #(n+1) of the CWDM coupler 21, and then is spectrum-sliced, and the spectrum-sliced optical signals are outputted from the split ports #1 through #n of the DWDM coupler 22-1 and are transmitted to the corresponding ONUs 30-1 through 30-n via the WDM couplers 25-1 through 25-n respectively and via the respective optical fiber transmission lines 3. The upstream optical signals of wavelength λu1 through λun which are inputted from the ONUs 30-1 through 30-n to the split ports #1 through #n of the DWDM coupler 22-2 are wavelength-division multiplexed and are outputted from its combine port #0.

The above-described structure is a structure (corresponding to the third preferred embodiment which is shown in FIG. 7) in which the optical carrier for upstream transmission which has been spectrum-sliced in the downstream transmission is supplied to the respective ONUs In this case, the DWDM coupler 22-2 which wavelength-division multiplexes the upstream optical signals may be an optical splitter/combiner which has no wavelength selectivity. Furthermore, in the case of the structure which spectrum slices and wavelength-division multiplexes the upstream optical signals which have been transmitted from each of the ONUs in the upstream transmission (corresponding to the fourth preferred embodiment which is shown in FIG. 8), it would also be acceptable for the DWDM coupler 22-1 to be an optical splitter/combiner which has no wavelength selectivity, and to supply the optical carrier for upstream transmission of wavelength λu to each of the ONUs just as it is without alteration.

Yet further, as in the structure of the second preferred embodiment which is shown in FIG. 6, when the optical carriers for upstream transmission of wavelengths λu1 through λun are transmitted from the OSU 10, they are split all together to the split port #(n+1) of the CWDM coupler 21, and optical carriers for upstream transmission of the respective wavelengths, just like those which were spectrum-sliced and were outputted from the split ports #1 through #n of the DWDM coupler 22-1, are supplied to each of the ONUs.

Figure 10:
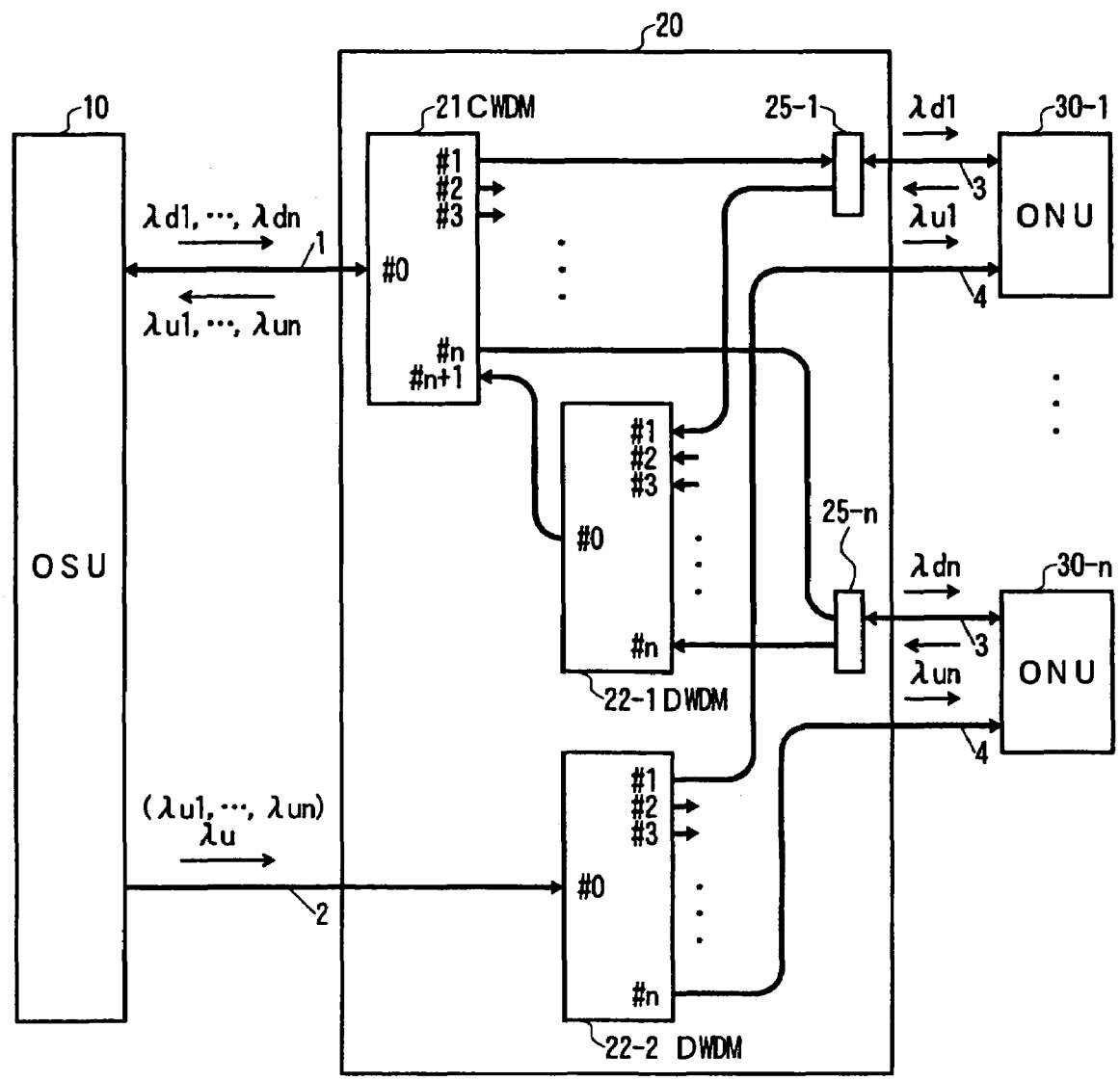
FIG. 10 is a figure showing a second structural example of the wavelength splitter 20 of the second through fourth preferred embodiments.

The Second Structural Example of the Wavelength Splitter 20 of the Second Through Fourth Preferred Embodiments FIG. 10 is a figure showing a second structural example of a wavelength splitter 20 which is incorporated in the second through the fourth preferred embodiments of the optical wavelength-division multiplexing access system according to the present invention.

The wavelength splitter 20 of this second structural example comprises a CWDM coupler 21, DWDM couplers 22-1 and 22-2, and WDM couplers 25-1 through 25-n, just like the first structural example described above, and the connections between these components are also the same as in the case of the first structural example. However, in the case of this second structural example, the directions of the signal are different.

The downstream optical signals of wavelengths λd1 through λdn which are inputted to the combine port #0 of the CWDM coupler 21 are split to its split ports #1 through #n, are transmitted to the WDM couplers 25-1 through 25-n respectively, and then are transmitted via the respective optical fiber transmission lines 3 to the corresponding ONUs 30-1 through 30-n. Furthermore, the optical carrier for upstream transmission of wavelength λu which is inputted to the combine port #0 of the DWDM coupler 22-2 is split to its split ports #1 through #n, and then is transmitted via the respective optical fiber transmission lines 4 to the corresponding ONUs 30-1 through 30-n.

The upstream optical signals of wavelengths λu1 through λun which are transmitted from the ONUs 30-1 through 30-n respectively and are inputted to the split ports #1 through #n of the DWDM coupler 22-1 via the WDM couplers 25-1 through 25-n. respectively are wavelength-division multiplexed and are outputted from its combine port #0. These n upstream optical signals are inputted to the split port #(n+1) of the CWDM coupler 21, and the n upstream optical signals are outputted from the combine port #0 of the CWDM coupler 21 by being handled equally with the single downstream optical signal.

The above-described structure is a structure (corresponding to the third preferred embodiment which is shown in FIG. 7) in which the optical carrier for upstream transmission which has been spectrum-sliced in the downstream transmission is supplied to the respective ONUs. In this case, it would also be acceptable for the DWDM coupler 22-1 which wavelength-division multiplexes the upstream optical signals to be an optical splitter/combiner which has no wavelength selectivity. Furthermore, in the case of the structure which spectrum slices and wavelength-division multiplexes the upstream optical signals which have been transmitted from each of the ONUs in the upstream transmission (corresponding to the fourth preferred embodiment which is shown in FIG. 8), it would also be acceptable for the DWDM coupler 22-2 to be an optical splitter/combiner which has no wavelength selectivity, and to supply the optical carrier for upstream transmission of wavelength λu to each of the ONUs just as it is without alteration.

Yet further, as in the structure of the second preferred embodiment which is shown in FIG. 6, when the optical carriers for upstream transmission of wavelengths λu1 through λun are transmitted from the OSU 10, optical carriers for upstream transmission of the respective wavelengths, just like those which were spectrum-sliced and were outputted from the split ports #1 through #n of the DWDM coupler 22-2, are supplied to each of the ONUs.

Furthermore, the structural example of the wavelength splitter 20 shown in FIGS. 9 and 10 is one which corresponds to the first structural example of the wavelength splitter 20 according to the first preferred embodiment shown in FIG. 2, or to the fourth structural example of the wavelength splitter 20 according to the first preferred embodiment shown in FIG. 5. In the same manner, it would also be acceptable to divide the DWDM coupler which performs the spectrum slicing into a plurality of DWDM couplers, which corresponds to the second structural example of the wavelength splitter 20 according to the first preferred embodiment shown in FIG. 3. Yet further, it would also be acceptable to connect the combine ports #0 of the CWDM coupler 21 and of the DWDM coupler 22-1 via the WDM coupler 25 to the optical fiber transmission line 1, which corresponds to the third structural example of the wavelength splitter 20 according to the first preferred embodiment shown in FIG. 4.

Even further, for example, it is possible for the WDM couplers 25 and 25-1 through 25-n which are used in the wavelength splitters 20 shown in FIGS. 4, 5, 9, and 10 to be implemented as optical wavelength filters which reflect the downstream optical signal or the upstream optical signal, while transmitting optical signals of other wavelengths. Or, alternatively, it would be possible to implement these WDM couplers as 3-port type optical circulators which output the downstream optical signal or the upstream optical signal to a single optical fiber transmission line, and which take in the upstream optical signal or the downstream optical signal which is inputted from that single optical fiber transmission line. Or, alternatively, optical couplers would be acceptable.

The Fifth Preferred Embodiment of the Optical WDM Access System of the Present Invention FIG. 11 is a figure showing a fifth preferred embodiment of the optical wavelength-division multiplexing access system according to the present invention. In this system, an optical power splitter 120, an optical fiber transmission line 101, and optical fiber transmission lines 103 are connected between a center unit (an OSU) 110 and a plurality n of optical network units (ONUs) 130-1 through 130-n. By doing this, this system is able to transmit downstream optical signals (of wavelengths $\lambda d1$ through $\lambda dn$) whose wavelengths are different from one another which are transmitted from the OSU 110 toward each of the ONUs 130-1 through 130-n, and also upstream optical signals (of wavelengths $\lambda u1$ through $\lambda un$) whose wavelengths are different from one another which are transmitted toward the OSU 110 from each of the ONUs 130-1 through 130-n, in both directions.

In the following, each of these structures will be described in more detail.

The optical fiber transmission lines consist of an optical fiber transmission line 101 which links together the OSU 110 and the optical power splitter 120, and a plurality of optical fiber transmission lines 103 which link together the optical power splitter 120 and each of the ONUs 130-1 through 130-n.

The OSU 110 wavelength-division multiplexes the downstream optical signals of wavelengths $\lambda d1$ through $\lambda dn$ and transmits the resulting wavelength-division multiplexed (WDM) downstream optical signal via the optical fiber transmission line 101 to the optical power splitter 120.

The optical power splitter 120 splits the optical power of the downstream optical signal which is inputted from the optical fiber transmission line 101, and outputs the downstream optical signals which have been thus split via the optical transmission lines 103 to the respective ONUs 130-1 through 130-n. Furthermore, this optical power splitter 120 combines the respective upstream optical signals of wavelengths $\lambda u1$ through $\lambda un$ which have been transmitted from the respective ONUs 130-1 through 130-n via the optical fiber transmission lines 103, and outputs the resulting combined upstream optical signal to the OSU 110 via the optical fiber transmission line 101.

As will be clear from the above explanation, it should be understood that the effect of the optical power splitter 120 is not limited to "splitting"; it functions as a splitter when splitting is to be performed, while, when optical signals are being propagated in the reverse direction, it functions as a combiner. In other words, although the optical power splitter 120 actually functions as an optical power splitter-combiner, in this specification, in the interests of simplicity, it has been termed an "optical power splitter".

Each of the ONUs 130-1 through 130-n receives, via its optical fiber transmission line 103, the downstream optical signal of wavelength which has been assigned to it from among the downstream optical signals of wavelength $\lambda d1$ through $\lambda dn$ which are transmitted. Furthermore, each of the ONUs 130-1 through 130-n generates the upstream optical signal of the wavelength which is assigned to it, and transmits this signal to the optical power splitter 120 via the optical fiber transmission line 103. It should be understood that, in the example shown in FIG. 11, the wavelength $\lambda dk$ and the wavelength $\lambda uk$ are assigned to the ONU 130-k (where k=1~n).

In this fifth preferred embodiment of the present invention, for at least the optical fiber transmission lines between the ONUs 130-1 through 130-n and the OSU 110, the central wavelength $\lambda uk$ (central frequency) of each of the upstream optical signals for each of the ONUs is selected at will from among an equally spaced wavelength grid (an equally spaced frequency grid) which is determined by a uniform wavelength spacing $\Delta\lambda u$ (a uniform optical frequency spacing $\Delta fu$), and its wavelength error (frequency error) is set to be within $\pm\Delta\lambda u/2$ ($\pm\Delta fu/2$). For example, if $\Delta\lambda u=200$ [GHz], the central frequency (the central wavelength $\lambda un$) of the upstream optical signals for the ONU 130-n. is set to 193,100 [GHz] (=about 1552.5 nm)+200×n [GHz] in the optical fiber transmission lines.

Each of the ONUs comprises an optical transmitting and receiving section 133 which comprises a wide spectrum light source section 131 which transmits upstream optical signals whose optical spectral width is twice or more the optical spectral width of the wavelength spacing $\Delta\lambda u$ (the optical frequency spacing $\Delta fu$) and an optical receiver 132 which receives the downstream optical signals and converts them into electrical signals, and an electrical processing section 134 which, along with performing predetermined electrical processing upon the electrical signals which are outputted from the optical receiver 132, also outputs an electrical signal to the wide spectrum light source 131 for controlling the wide spectrum light source 131.

Respective optical filter units 140-1 through 140-n are connected via optical connectors 150 to the input/output ends of the ONUs 130-1 through 130-n on the optical fiber transmission line 103 side (the OSU 110 side). Due to the provision of these optical connectors 150, it is possible easily to attach and to detach the optical filter units 140-1 through 140-n to and from the optical transmitting and receiving sections 133 within the ONUs 130-1 through 130-n. Furthermore, although not shown in FIG. 11, a further input/output end of each of the ONUs 130-1 through 130-n serves as a user interface (refer to FIGS. 13A and 13B).

Each of the optical filter units 140-k demultiplexes, from among all the downstream optical signals which are inputted from the optical fiber transmission line 103, the optical signal of wavelength $\lambda dk$ which is assigned to the ONU 130-k which corresponds to the optical filter unit 140-k, and, along with outputting the demultiplexed optical signal to the optical transmitting and receiving section 133 within that ONU 130-k, also spectrum slices the upstream optical signal from the optical transmitting and receiving section 133 at the wavelength $\lambda dk$, and outputs the spectrum-sliced optical signal to the optical fiber transmission line 103. As shown in FIG. 11, for example, the broadband light which is outputted from the wide spectrum light source 131 of the ONU 130-n is spectrum-sliced by the optical filter unit 140-n. As a result, an upstream optical signal which takes as its central wavelength the wavelength λu n is outputted to the optical fiber transmission line 103.

More concretely, the upstream optical signal is spectrum-sliced by the optical filter unit 140-k at a wavelength width (a frequency width) of wavelength spacing Δλu (frequency spacing Δfu) centered upon the central wavelength (central frequency) which has been set for each of the ONUs.

For example, as described above, if the central frequencies (the central wavelengths) of the upstream optical signals for the ONUs 130-n upon the optical fiber transmission lines are set to be 193,100 [GHz] (=about 1552.5 [nm])±200×n [GHz], then the optical spectral width of the upstream optical signal which is outputted from the wide spectrum light source 131 within each of the ONUs should have a width of 200×n [GHz] from 193,100 [GHz] to 193,100+200×n [GHz]. Accordingly, if a wide spectrum light source 131 is employed which has a spectral width of 8~16×200 [GHz] (=about 0.8 [nm]), i.e. of about 6.4 [nm]~12.8 [nm], then it is possible to implement an optical wavelength-division multiplexing access system of n=8~16.

It should be understood that, apart from the matter of the optical filter units 140-1 through 140-n, the ONUs 130-1 through 130-n are all of the same structure. Furthermore, basically all of the optical filter units 140-k are of the same structure, except that they mutually differ in that each of them is designed so as to transmit and receive the optical signal which has the unique wavelength ?dk which has been assigned to the ONU 130-k which corresponds to the optical filter unit 140-k to and from the optical power splitter 120. Due to this arrangement, it is possible to attach and to detach the optical filter units 140-1 through 140-n to and from the optical transmitting and receiving sections 133.

According to this fifth preferred embodiment of the present invention, a spectrum-slicing scheme is employed in an optical access system which combines and splits a plurality of signals via an optical power splitter, whereby a system is implemented in which each of the ONUs performs communication with the OSU by occupying a different wavelength. Furthermore, since the active functional sections which comprise the wide spectrum light sources 131, the optical receivers 132, and the electrical processing sections 134 can be easily separated from the passive functional sections which comprise the optical filter units 140-k, accordingly it is possible to advance component standardization of the ONUs 130-1 through 130-n, thus reducing the total manufacturing cost. Yet further, the usability in practice is greatly enhanced by fitting optical filter units which have been assigned to each of the users to ONUs of the same type, since, via the optical connectors 150, it is possible easily to attach and detach the optical filter units 140-k to and from the optical transmitting and receiving sections 133.

The Sixth Preferred Embodiment of the Optical WDM Access System of the Present Invention FIG. 12 is a figure showing the structure of a sixth preferred embodiment of the optical wavelength-division multiplexing access system according to the present invention. It should be understood that, in FIG. 12, to elements which correspond to ones shown in FIG. 11 and which have the same functions, the same reference symbols are appended, and description thereof will be curtailed.

With this sixth preferred embodiment, in the fifth preferred embodiment of the optical wavelength-division multiplexing access system of the present invention, the wavelength spacing Δλd (the optical frequency spacing Δfd) of the downstream signal in the optical fiber transmission line is set to twice or more the wavelength spacing Δλu (the optical frequency spacing Δfu) of the upstream signal.

Furthermore, at least between the OSU 110 and the ONUs 130-1 through 130-n, the central wavelengths (the central frequencies) λd1 through λdn of the downstream optical signals which correspond to the respective ONUs 130-1 through 130-n are each selected at will from among an equally spaced wavelength grid (an equally spaced frequency grid) which is defined by a uniform wavelength spacing Δλd (optical frequency spacing Δfd), and their wavelength errors (frequency errors) are set to be within ±Δλd/2 (±Δfd/2).

In concrete terms, it may be supposed that the wavelengths of the downstream optical signals are selected at will from an equally spaced frequency grid with a 20 nm spacing. In this case, the wavelengths of the downstream optical signals which correspond to the ONUs 130-1 through 130-8 may, for example, be set to 1430 nm, 1450 nm, 1470 nm, 1490 nm, 1510 nm, 1570 nm, 1590 nm, and 1610 nm. Furthermore, the wavelengths λu1 through λun of the upstream optical signals are arranged in the vicinity of 1530 nm and 1550 nm which are selected at will from an equally spaced frequency grid with a 20 nm spacing and are interposed between the wavelengths of 1510 nm and 1570 nm.

With this sixth preferred embodiment, in the generation of the downstream optical signal by the OSU 110, it is desirable to utilize separate lasers (LD) for each of the wavelengths. If LDs are utilized, it becomes easy to provide a lightweight device at a low cost, since the requirements upon wavelength stability of the LDs become more moderate the wider the wavelength spacing of the wavelength grid becomes.

By employing the structure and the wavelength arrangement as in this preferred embodiment, along with it being possible to use a single type of ONU, it also becomes possible to provide a more lightweight OSU at a lower cost.

Figure 13A:
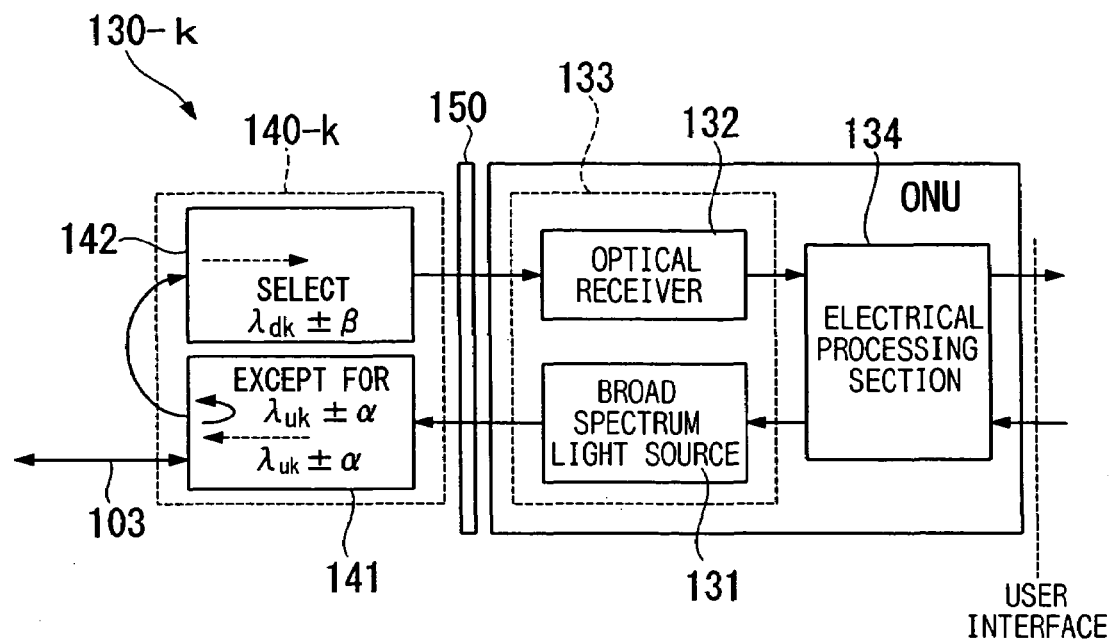
FIG. 13A is a figure showing a seventh preferred embodiment of the present invention, and particularly showing a first structural example of an optical filter unit according to the fifth or the sixth preferred embodiment.
Figure 13B:
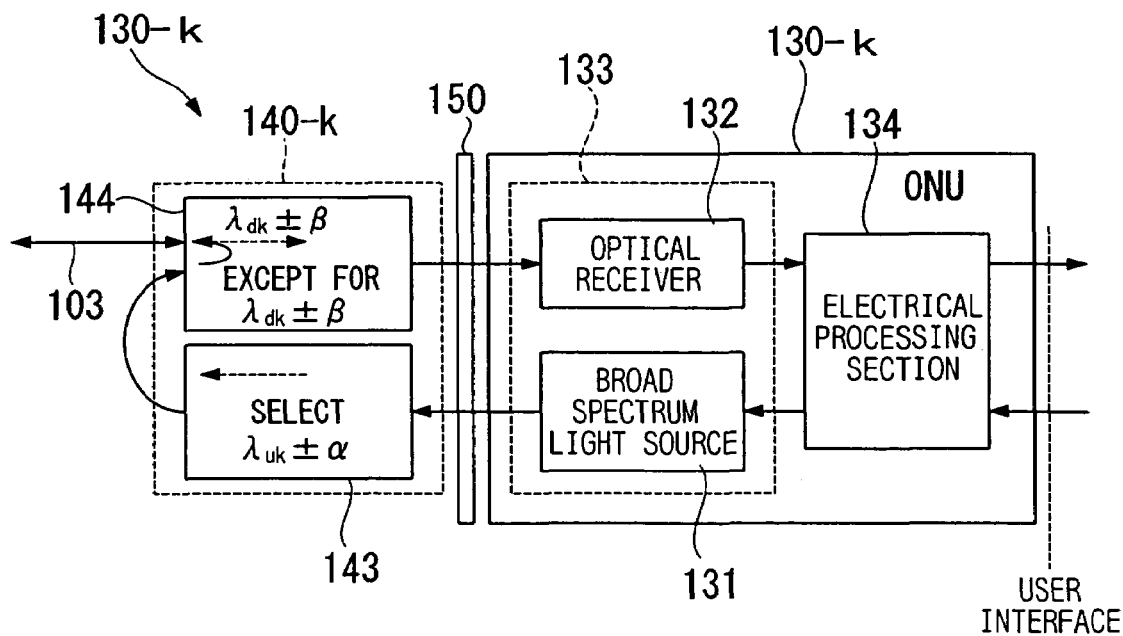
FIG. 13B is another figure showing the seventh preferred embodiment of the present invention, and particularly showing a second structural example of the optical filter unit according to the fifth or the sixth preferred embodiment.
Figure 14:
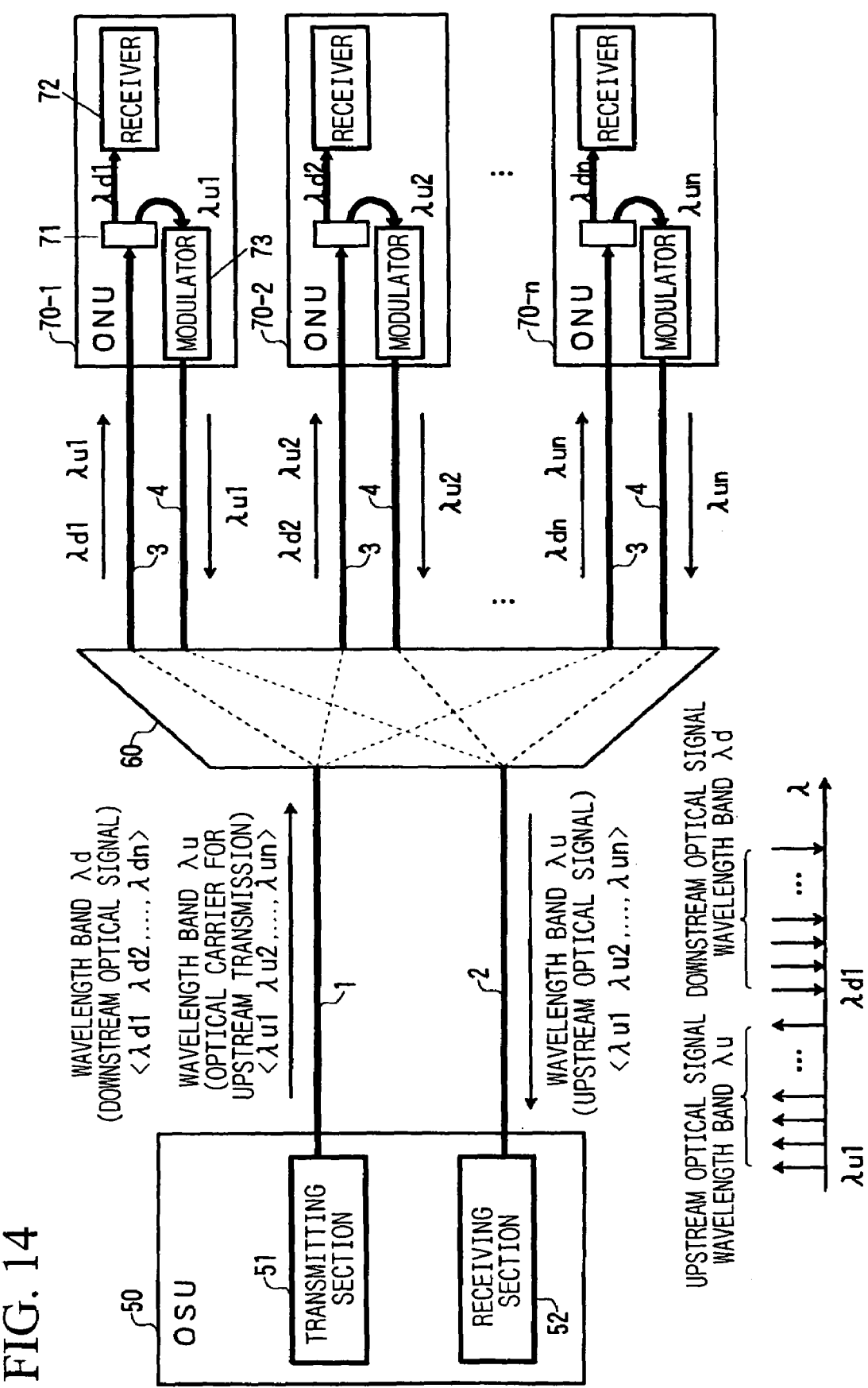
FIG. 14 is a figure showing a first structural example of a conventional optical WDM access system.
Figure 15:
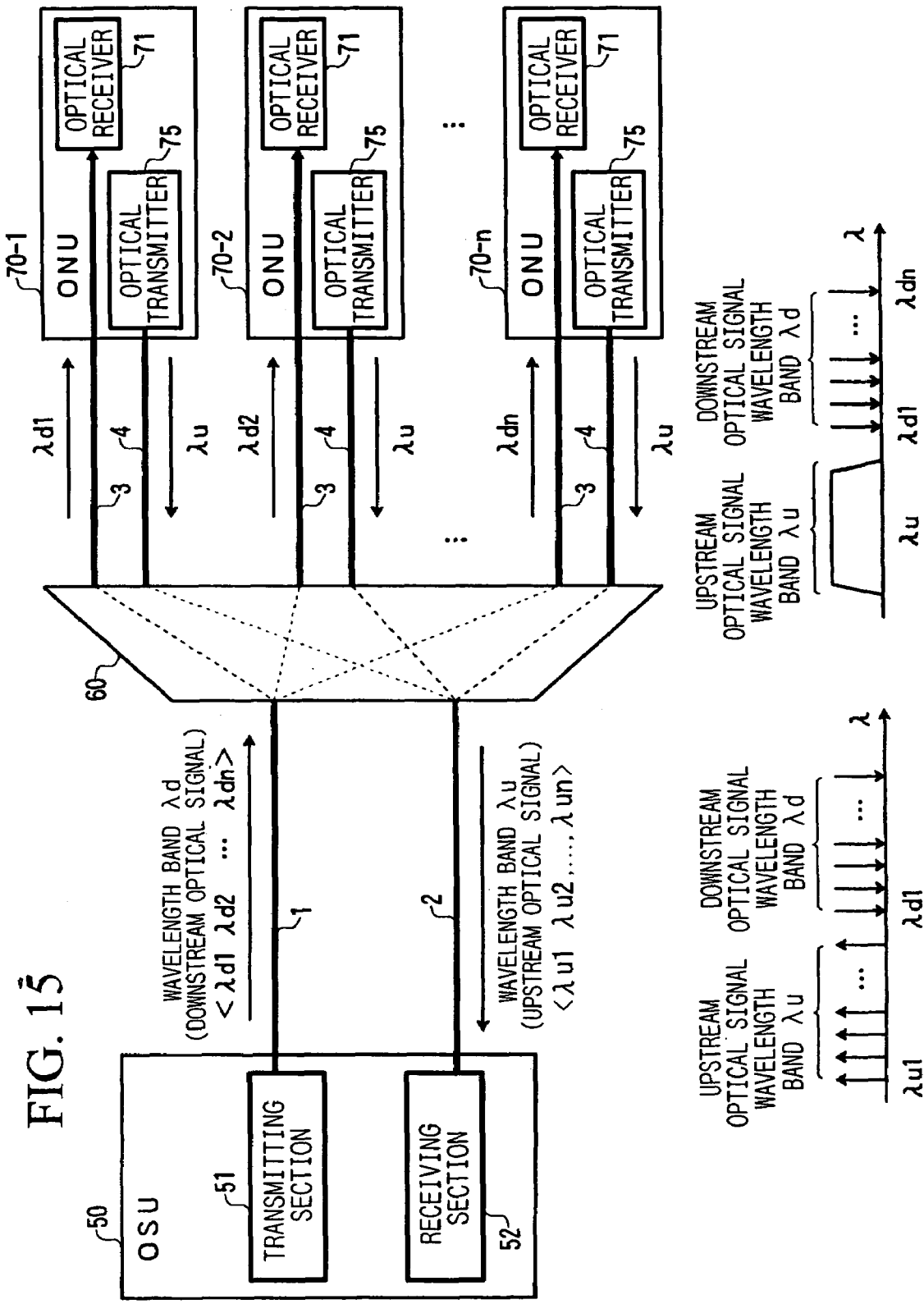
FIG. 15 is a figure showing a second structural example of a conventional optical WDM access system.

The Seventh Preferred Embodiment of the Optical WDM Access System of the Present Invention FIGS. 13A and 13B are figures explaining a seventh preferred embodiment of the present invention, and in particular show structural examples for an optical filter unit which may be incorporated in the fifth or the sixth preferred embodiments described above. It should be understood that, in FIGS. 13A and 13B, to elements which correspond to ones shown in FIGS. 11 and 12 and which have the same functions, the same reference symbols are appended, and description thereof will be curtailed.

The optical filter unit 140-k of FIG. 13A comprises: a wavelength filter 141 which multiplexes and demultiplexes a wavelength λsend±α which must be obtained by spectrum-slicing the optical signal which is transmitted from the wide spectrum light source 131 (where α is a wavelength width (a frequency width) less than or equal to ¼ of the optical spectral width Δλ (the frequency width Δf) of the optical signal which is transmitted from the wide spectrum light source 131), and a wavelength range outside λsend±α, including at least the wavelength λreceive of an optical signal to be received; and a wavelength filter 142 which selects an optical signal of wavelength λreceive±β (where β is any desired wavelength width). It should be understood that, in FIG. 13A, the wavelength λsend is the wavelength λuk, while the wavelength λreceive is the wavelength λdk.

Furthermore, α is set to less than or equal to ½ of the wavelength spacing $\Delta\lambda u$, while β is set to less than or equal to ½ of the wavelength spacing $\Delta\lambda d$.

An optical signal which has been generated from a wide spectrum light source 131 is spectrum-sliced at a central wavelength λsend by the wavelength filter 141, and is simultaneously stream multiplexed with an optical signal from the optical fiber transmission line 103 by the wavelength filter 141, and is then outputted to the optical fiber transmission line 103.

On the other hand, an optical signal of a wavelength range outside λsend±α which is included in the optical signal from the optical fiber transmission line 103 is demultiplexed by the wavelength filter 141 from the optical signal of wavelength λsend±α which is outputted to the optical fiber transmission line 103 and is outputted to the wavelength filter 142, and then the optical signal of wavelength λdk±β is demultiplexed by the wavelength filter 142 from another optical signal which has no relationship with the ONU 130-k and is outputted to an optical receiver 132.

The optical filter unit 140-k of FIG. 13B comprises: a wavelength filter 143 which selects a wavelength λsend±α which must be obtained by spectrum-slicing the optical signal which is transmitted from the wide spectrum light source 131; and a wavelength filter 144 which multiplexes and demultiplexes the wavelength λreceive±β of an optical signal which is received and a wavelength range outside λreceive±β, including at least λsend±α. It should be understood that, in FIG. 13B, the wavelength λsend is the wavelength λuk, while the wavelength λreceive is the wavelength λdk. Furthermore, α is set to less than or equal to ½ of the wavelength spacing $\Delta\lambda u$, while β is set to less than or equal to ½ of the wavelength spacing $\Delta\lambda d$.

The optical signal which has been generated from the wide spectrum light source 131 is spectrum-sliced at a central wavelength λsend by the wavelength filter 143 and is outputted to the wavelength filter 144, and is stream multiplexed by this wavelength filter 144 with an optical signal from the optical fiber transmission line 103, then being outputted to the optical fiber transmission line 103.

On the other hand, the optical signal of a wavelength range λdk±β which is included in the optical signal inputted from the optical fiber transmission line 103 is demultiplexed by the wavelength filter 144 from the other optical signals which are not related with this ONU 130k and from the optical signal of wavelength λsend±α, and is outputted to the optical receiver 132.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical wavelength-division multiplexing access system, in which a center unit (OSU) and a plurality of n optical network units (ONUs) are connected via a wavelength splitter and optical fiber transmission lines, and downstream optical signals from the OSU to the respective ONUs and upstream optical signals from the respective ONUs to the OSU are transmitted in both directions, wherein:

at least between the OSU and the wavelength splitter, the central wavelengths (the central frequencies) of the downstream optical signals which correspond to the ONUs are selected at will from within an equally spaced wavelength grid (an equally spaced frequency grid) which is determined by a uniform wavelength spacing of $\Delta\lambda d$ (a uniform optical frequency spacing of $\Delta fd$), and their wavelength errors (optical frequency errors) are set to be within $\pm\Delta\lambda d/2$ ($\pm\Delta fd/2$);

at least between the wavelength splitter and the OSU, the central wavelengths (the central frequencies) of the upstream optical signals which correspond to the ONUs are selected at will from within an equally spaced wavelength grid (an equally spaced frequency grid) which is determined by a uniform wavelength spacing of $\Delta\lambda u$ (a uniform optical frequency spacing of $\Delta fu$), and their wavelength errors (optical frequency errors) are set to be within $\pm\Delta\lambda u/2$ ($\pm\Delta fu/2$);

the wavelength spacing $\Delta\lambda d$ (the optical frequency spacing $\Delta fd$) of the downstream optical signals is set to twice or more the wavelength spacing $\Delta\lambda u$ (the optical frequency spacing $\Delta fu$) of the upstream optical signals; and each of the ONUs transmits an upstream optical signal whose optical spectral width is twice or more $\Delta\lambda u$ ($\Delta fu$), and the wavelength splitter spectrum slices the upstream signals which have been transmitted from the ONUs into wavelengths (optical frequencies) whose optical spectral widths are mutually different within $\Delta\lambda u$ ($\Delta fu$), and also wavelength-division multiplexes the spectrum-sliced signals and transmits the multiplexed signal to the OSU.

2. An optical wavelength-division multiplexing access system, in which a center unit (OSU) and a plurality of n optical network units (ONUs) are connected via a wavelength splitter and optical fiber transmission lines, and downstream optical signals from the OSU to the respective ONUs and upstream optical signals from the respective ONUs to the OSU are transmitted in both directions, wherein:

at least between the OSU and the wavelength splitter, the central wavelengths (the central frequencies) of the downstream optical signals which correspond to the ONUs are selected at will from within an equally spaced wavelength grid (an equally spaced frequency grid) which is determined by a uniform wavelength spacing of $\Delta\lambda d$ (a uniform optical frequency spacing of $\Delta fd$), and their wavelength errors (optical frequency errors) are set to be within $\pm\Delta\lambda d/2$ ($\pm\Delta fd/2$);

at least between the wavelength splitter and the OSU, the central wavelengths (the central frequencies) of the upstream optical signals which correspond to the ONUs are selected at will from within an equally spaced wavelength grid (an equally spaced frequency grid) which is determined by a uniform wavelength spacing of $\Delta\lambda u$ (a uniform optical frequency spacing of $\Delta fu$), and their wavelength errors (optical frequency errors) are set to be within $\pm\Delta\lambda u/2$ ($\pm\Delta fu/2$);

the wavelength spacing $\Delta\lambda d$ (the optical frequency spacing $\Delta fd$) of the downstream optical signals is set to twice or more the wavelength spacing $\Delta\lambda u$ (the optical frequency spacing $\Delta fu$) of the upstream optical signals; and the OSU transmits an optical carrier for upstream transmission which corresponds to the wavelength spacing (the optical frequency spacing) of the upstream optical signals; the wavelength splitter demultiplexes the optical carrier for upstream transmission and supplies the demultiplexed optical carriers to the ONUs; each of the ONUs modulates the optical carrier for upstream transmission and transmits the modulated optical carrier as an upstream optical signal; and the wavelength splitter wavelength-division multiplexes the upstream optical signals which have been transmitted from the respective ONUs and transmits the multiplexed optical signal to the OSU.

3. An optical wavelength-division multiplexing access system, in which a center unit (OSU) and a plurality of n optical network units (ONUs) are connected via a wavelength splitter and optical fiber transmission lines, and downstream optical signals from the OSU to the respective ONUs and upstream optical signals from the respective ONUs to the OSU are transmitted in both directions, wherein:

at least between the OSU and the wavelength splitter, the central wavelengths (the central frequencies) of the downstream optical signals which correspond to the ONUs are selected at will from within an equally spaced wavelength grid (an equally spaced frequency grid) which is determined by a uniform wavelength spacing of $\Delta\lambda d$ (a uniform optical frequency spacing of $\Delta fd$), and their wavelength errors (optical frequency errors) are set to be within $\pm\Delta\lambda d/2$ ($\pm\Delta fd/2$);

at least between the wavelength splitter and the OSU, the central wavelengths (the central frequencies) of the upstream optical signals which correspond to the ONUs are selected at will from within an equally spaced wavelength grid (an equally spaced frequency grid) which is determined by a uniform wavelength spacing of $\Delta\lambda u$ (a uniform optical frequency spacing of $\Delta fu$), and their wavelength errors (optical frequency errors) are set to be within $\pm\Delta\lambda u/2$ ($\pm\Delta fu/2$);

the wavelength spacing $\Delta\lambda d$ (the optical frequency spacing $\Delta fd$) of the downstream optical signals is set to twice or more the wavelength spacing $\Delta\lambda u$ (the optical frequency spacing $\Delta fu$) of the upstream optical signals; and the OSU transmits an optical carrier for upstream transmission of optical spectral width twice or more $\Delta\lambda u$ ($\Delta fu$); the wavelength splitter spectrum slices the optical carrier for upstream transmission into wavelengths (optical frequencies) whose optical spectral widths are mutually different within $\Delta\lambda u$ ($\Delta fu$) and supplies the spectrum-sliced optical signals to the respective ONUs; each of the ONUs modulates its optical carrier for upstream transmission of a given wavelength (of a given optical frequency) and transmits the modulated optical carrier as an upstream optical signal; and the wavelength splitter wavelength-division multiplexes the upstream optical signals which have been transmitted from the respective ONUs and transmits the multiplexed optical signal to the OSU.

4. An optical wavelength-division multiplexing access system, in which a center unit (OSU) and a plurality of n optical network units (ONUs) are connected via a wavelength splitter and optical fiber transmission lines, and downstream optical signals from the OSU to the respective ONUs and upstream optical signals from the respective ONUs to the OSU are transmitted in both directions, wherein:

at least between the OSU and the wavelength splitter, the central wavelengths (the central frequencies) of the downstream optical signals which correspond to the ONUs are selected at will from within an equally spaced wavelength grid (an equally spaced frequency grid) which is determined by a uniform wavelength spacing of $\Delta\lambda d$ (a uniform optical frequency spacing of $\Delta fd$), and their wavelength errors (optical frequency errors) are set to be within $\pm\Delta\lambda d/2$ ($\pm\Delta fd/2$);

at least between the wavelength splitter and the OSU, the central wavelengths (the central frequencies) of the upstream optical signals which correspond to the ONUs are selected at will from within an equally spaced wavelength grid (an equally spaced frequency grid) which is determined by a uniform wavelength spacing of $\Delta\lambda u$ (a uniform optical frequency spacing of $\Delta fu$), and their wavelength errors (optical frequency errors) are set to be within $\pm\Delta\lambda u/2$ ($\pm\Delta fu/2$);

the wavelength spacing $\Delta\lambda d$ (the optical frequency spacing $\Delta fd$) of the downstream optical signals is set to twice or more the wavelength spacing $\Delta\lambda u$ (the optical frequency spacing $\Delta fu$) of the upstream optical signals; and the OSU transmits an optical carrier for upstream transmission of optical spectral width twice or more $\Delta\lambda u$ ($\Delta fu$); the wavelength splitter splits the optical carrier for upstream transmission into n and supplies the split optical carriers for upstream transmission to the ONUs; each of the ONUs modulates the split optical carrier for upstream transmission and transmits the modulated optical carrier as an upstream optical signal; and the wavelength splitter spectrum slices the upstream optical signals which have thus been transmitted from the ONUs into wavelengths (optical frequencies) whose optical spectral widths are mutually different within $\Delta\lambda u$ ($\Delta fu$), and wavelength-division multiplexes the spectrum-sliced optical signals and transmits the multiplexed optical signal to the OSU.

5. An optical wavelength-division multiplexing access system as described in claim 1, wherein:

the wavelength splitter comprises: a first wavelength splitting section which comprises a single combine port and (n+1) split ports, and which demultiplexes into wavelength regions (optical frequency regions) which take as (n+1) central wavelengths (central optical frequencies) which are selected from within an equally spaced wavelength grid (an equally spaced frequency grid) which is determined by a uniform wavelength spacing of $\Delta\lambda d$ (a uniform optical frequency spacing of $\Delta fd$) within a transmission width of $\pm\Delta\lambda d/2$ ($\pm\Delta fd/2$); and a second wavelength splitting section which comprises a single combine port and n split ports, and which demultiplexes into wavelength regions (optical frequency regions) which take as n central wavelengths (central optical frequencies) which are selected from within an equally spaced wavelength grid (an equally spaced frequency grid) which is determined by a uniform wavelength spacing of $\Delta\lambda u$ (a uniform optical frequency spacing of $\Delta fu$) within a transmission width of $\pm\Delta\lambda u/2$ ($\pm\Delta fu/2$);

and: the combine port of the first wavelength splitting section is connected to the OSU via a one of the optical fiber transmission lines, n of the split ports of the first wavelength splitting section are connected each to one of the ONUs via one of the optical fiber transmission lines, the other split port of the first wavelength splitting section is connected to the combine port of the second wavelength splitting section, and the n split ports of the second wavelength splitting section are connected each to one of the ONUs via a one of the optical fiber transmission lines.

6. An optical wavelength division-multiplexing access system as described in claim 1, wherein:
the wavelength splitter comprises: a first wavelength splitting section which comprises a single combine port and (n+2) split ports, and which demultiplexes into wavelength regions (optical frequency regions) which take as (n+2) central wavelengths (optical frequencies) which are selected from within an equally spaced wavelength grid (an equally spaced frequency grid) which is determined by a uniform wavelength spacing of $\Delta\lambda d$ (a uniform optical frequency spacing of $\Delta fd$) within a transmission width of $\pm\Delta\lambda d/2$ ($\pm\Delta fd/2$); a second wavelength splitting section which comprises a single combine port and m split ports, and which demultiplexes into wavelength regions (optical frequency regions) which take as m central wavelengths (optical frequencies) which are selected from within an equally spaced wavelength grid (an equally spaced frequency grid) which is determined by a uniform wavelength spacing of $\Delta\lambda u$ (a uniform optical frequency spacing of $\Delta fu$) within a transmission width of $\pm\Delta\lambda u/2$ ($\pm\Delta fu/2$); and a third wavelength splitting section which comprises a single combine port and (n−m) split ports, otherwise being the same as the second wavelength splitting section;
and: the combine port of the first wavelength splitting section is connected to the OSU via a one of the optical fiber transmission lines, n of the split ports of the first wavelength splitting section are connected each to one of the ONUs via one of the optical fiber transmission lines, the other two split ports of the first wavelength splitting section are respectively connected to the combine ports of the second and the third wavelength splitting section, and the m split ports of the second wavelength splitting section and the (n−m) split ports of the third wavelength splitting section are connected each to one of the ONUs via a one of the optical fiber transmission lines.

7. An optical wavelength-division multiplexing access system as described in claim 1, wherein:
the wavelength splitter comprises: an upstream and downstream wavelength splitting section which comprises a single combine port and two split ports, and which splits and combines the upstream optical signals and the downstream optical signals; a first wavelength splitting section which comprises a single combine port and n split ports, and which demultiplexes into wavelength regions (optical frequency regions) which take as n central wavelengths (optical frequencies) which are selected from within an equally spaced wavelength grid (an equally spaced frequency grid) which is determined by a uniform wavelength spacing of $\Delta\lambda d$ (a uniform optical frequency spacing of $\Delta fd$) within a transmission width of $\pm\Delta\lambda d/2$ ($\pm\Delta fd/2$); and a second wavelength splitting section which comprises a single combine port and n split ports, and which demultiplexes into wavelength regions (optical frequency regions) which take as n central wavelengths (optical frequencies) which are selected from within an equally spaced wavelength grid (an equally spaced frequency grid) which is determined by a uniform wavelength spacing of $\Delta\lambda u$ (a uniform optical frequency spacing of $\Delta fu$) within a transmission width of $\pm\Delta\lambda u/2$ ($\pm\Delta fu/2$);
and: the combine port of the upstream and downstream wavelength splitting section is connected to the OSU via a one of the optical fiber transmission lines, the two split ports of the upstream and downstream wavelength splitting section are connected each to one of the combine ports of the first and the second wavelength splitting section, the n split ports of the first wavelength splitting section are connected each to one of the ONUs via a one of the optical fiber transmission lines, and the n split ports of the second wavelength splitting section are connected each to one of the ONUs via a one of the optical fiber transmission lines.

8. An optical wavelength-division multiplexing access system as described in any one of claims 2 through 4, wherein:
the wavelength splitter comprises: a first wavelength splitting section which comprises a single combine port and (n+1) split ports, and which demultiplexes into wavelength regions (optical frequency regions) which take as (n+1) central wavelengths (optical frequencies) which are selected from within an equally spaced wavelength grid (an equally spaced frequency grid) which is determined by a uniform wavelength spacing of $\Delta\lambda d$ (a uniform optical frequency spacing of $\Delta fd$) within a transmission width of $\pm\Delta\lambda d/2$ ($\pm\Delta fd/2$); a second and a third wavelength splitting section, each of which comprises a single combine port and n split ports, and each of which demultiplexes into wavelength regions (optical frequency regions) which take as n central wavelengths (optical frequencies) which are selected from within an equally spaced wavelength grid (an equally spaced frequency grid) which is determined by a uniform wavelength spacing of $\Delta\lambda u$ (a uniform optical frequency spacing of $\Delta fu$) within a transmission width of $\pm\Delta\lambda u/2$ ($\pm\Delta fu/2$); and n upstream and downstream wavelength splitting section which combine the downstream optical signals and the optical carriers for upstream transmission, and split the downstream optical signals and the optical signals for upstream transmission;
and: the combine port of the first wavelength splitting section is connected to the OSU via a one of the optical fiber transmission lines, n of the split ports of the first wavelength splitting section are connected each to a one of the ONUs via a one of the upstream and downstream wavelength splitting section and a one of the optical fiber transmission lines, the other split port of the first wavelength splitting section is connected to the combine port of the second wavelength splitting section, the n split ports of the second wavelength splitting section are connected each to a one of the ONUs via a one of the upstream and downstream wavelength splitting section and a one of the optical fiber transmission lines, the n split ports of the third wavelength splitting section are connected each to a one of the ONUs via a one of the optical fiber transmission lines, and the combine port of the third wavelength splitting section is connected to the OSU via a one of the optical fiber transmission lines.

9. An optical wavelength-division multiplexing access system as described in any one of claims 5 through 7, wherein a single one of the optical fiber transmission lines is connected between the wavelength splitting section and each of the ONUs, and the wavelength splitting section comprises upstream and downstream wavelength splitting sections, each of which is connected to the single one of the optical fiber transmission lines connected to each of the ONUs, and which splits and combines the upstream optical signals and the downstream optical signals.

10. A wavelength splitter comprising: a first input/output end; and a second input/output end, wherein:

optical signals which are inputted from transmission lines upon the side of the second input/output end and whose optical spectral width is twice or more a wavelength spacing $\Delta\lambda u$ (an optical frequency spacing $\Delta fu$) are spectrum-sliced into wavelengths (optical frequencies) whose optical spectral widths are mutually different within the wavelength spacing $\Delta\lambda u$ (the optical frequency spacing $\Delta fu$), which then are wavelength-division multiplexed and are transmitted to a transmission line upon the side of the first input/output end; and a wavelength-division multiplexed optical signal which is inputted from the transmission line upon the side of the first input/output end and whose wavelength spacing $\Delta\lambda d$ (optical frequency spacing $\Delta fd$) has been set to twice or more the wavelength spacing $\Delta\lambda u$ (the optical frequency spacing $\Delta fu$) is demultiplexed and the demultiplexed optical signals are transmitted to the transmission lines upon the side of the second input/output end.

11. A wavelength splitter comprising: a first input/output end; and a second input/output end, wherein:

optical signals of wavelength spacing $\Delta\lambda u$ (optical frequency spacing $\Delta fu$) which are inputted from transmission lines upon the side of the second input/output end are wavelength-division multiplexed and then transmitted to a transmission line upon the side of the first input/output end;

a wavelength-division multiplexed optical signal which is inputted from the transmission line upon the side of the first input/output end and which corresponds to the optical signals of wavelength spacing $\Delta\lambda u$ (optical frequency spacing $\Delta fu$) which are inputted from the transmission lines upon the side of the second input/output end is demultiplexed and then is supplied to the respective transmission lines upon the side of the second input/output end; and a wavelength-division multiplexed optical signal which is inputted from the transmission line upon the side of the first input/output end and whose wavelength spacing $\Delta\lambda d$ (optical frequency spacing $\Delta fd$) has been set to twice or more the wavelength spacing $\Delta\lambda u$ (optical frequency spacing $\Delta fu$) is demultiplexed and then is supplied to respective transmission lines upon the side of the second input/output end.

12. A wavelength splitter comprising: a first input/output end; and second input/output end, wherein:

optical signals of wavelength spacing $\Delta\lambda u$ (optical frequency spacing $\Delta fu$) which are inputted from transmission lines upon the side of the second input/output end are wavelength-division multiplexed and then outputted to a transmission line upon the side of the first input/output end;

an optical signal which is inputted from the transmission line upon the side of the first input/output end and whose optical spectral width is twice or more the wavelength spacing $\Delta\lambda u$ (optical frequency spacing $\Delta fu$) is spectrum-sliced into wavelengths (optical frequencies) whose optical spectral widths are mutually different within the wavelength spacing $\Delta\lambda u$ (the optical frequency spacing $\Delta fu$), which are then supplied to the respective transmission lines upon the side of the second input/output end; and a wavelength-division multiplexed optical signal which is inputted from the transmission line upon the side of the first input/output end and whose wavelength spacing $\Delta\lambda d$ (optical frequency spacing $\Delta fd$) has been set to twice or more the wavelength spacing $\Delta\lambda u$ (optical frequency spacing $\Delta fu$) is demultiplexed and then is supplied to the respective transmission lines upon the side of the second input/output end.

13. A wavelength splitter comprising: a first input/output end; and second input/output end, wherein:

optical signals which are inputted from transmission lines upon the side of the second input/output end and whose optical spectral widths have been set to twice or more the wavelength spacing $\Delta\lambda u$ (the optical frequency spacing $\Delta fu$) are spectrum-sliced into wavelengths (optical frequencies) whose optical spectral widths are mutually different within the wavelength spacing $\Delta\lambda u$ (the optical frequency spacing $\Delta fu$), which are then wavelength-division multiplexed and are supplied to a transmission line upon the side of the first input/output end;

a wavelength-division multiplexed optical signal which is inputted from the transmission line upon the side of the first input/output end and whose wavelength spacing $\Delta\lambda d$ (optical frequency spacing $\Delta fd$) has been set to twice or more the wavelength spacing $\Delta\lambda u$ (optical frequency spacing $\Delta fu$) is demultiplexed and then is supplied to the respective transmission lines upon the side of the second input/output end; and an optical signal which is inputted from a transmission line upon the side of the first input/output end and whose optical spectral width is twice or more the wavelength spacing $\Delta\lambda u$ (optical frequency spacing $\Delta fu$) is demultiplexed and then is supplied to the respective transmission lines upon the side of the second input/output end.

14. A wavelength splitter as described in claim 10, comprising:

a first wavelength splitting section which comprises a single combine port and (n+1) split ports, and which demultiplexes an optical signal which has been inputted into the combine port into wavelength regions (optical frequency regions) which take as (n+1) central wavelengths (optical frequencies) which are selected from within an equally spaced wavelength grid (an equally spaced frequency grid) which is determined by a uniform wavelength spacing of $\Delta\lambda d$ (a uniform optical frequency spacing of $\Delta fd$) within a transmission width of $\pm\Delta\lambda/2$ ($\pm\Delta fd/2$);

a second wavelength splitting section which comprises a single combine port and n split ports, and which demultiplexes an optical signal which has been inputted into the combine port into wavelength regions (optical frequency regions) which take as n central wavelengths (optical frequencies) which are selected from within an equally spaced wavelength grid (an equally spaced frequency grid) which is determined by a uniform wavelength spacing of $\Delta\lambda u$ (a uniform optical frequency spacing of $\Delta fu$) within a transmission width of $\pm\Delta\lambda u/2$ ($\pm\Delta fu/2$);

and wherein the combine port of the first wavelength splitting section is connected to the transmission line on the side of the first input/output end, n of the split ports of the first wavelength splitting section are connected each to a transmission line on the side of the second input/output end, the other split port of the first wavelength splitting section is connected to the combine port of the second wavelength splitting section, and the n split ports of the second wavelength splitting section are connected each to one of the transmission lines on the side of the second input/output end.

15. A wavelength splitter as described in claim 10, comprising:

a first wavelength splitting section which comprises a single combine port and (n+2) split ports, and which demultiplexes an optical signal which has been inputted to the combine port into wavelength regions (optical frequency regions) which take as (n+2) central wavelengths (optical frequencies) which are selected from within an equally spaced wavelength grid (an equally spaced frequency grid) which is determined by a uniform wavelength spacing of $\Delta\lambda d$ (a uniform optical frequency spacing of $\Delta fd$) within a transmission width of $\pm\Delta\lambda d/2$ ($\pm\Delta fd/2$);

a second wavelength splitting section which comprises a single combine port and m split ports, and which demultiplexes an optical signal which has been inputted to the combine port into wavelength regions (optical frequency regions) which take as m central m wavelengths (optical frequencies) which are selected from within an equally spaced wavelength grid (an equally spaced frequency grid) which is determined by a uniform wavelength spacing of $\Delta\lambda u$ (a uniform optical frequency spacing of $\Delta fu$) within a transmission width of $\pm\Delta\lambda u/2$ ($\pm\Delta fu/2$);

and a third wavelength splitting section which comprises a single combine port and (n−m) split ports, otherwise being the same as the second wavelength splitting section;

and wherein: the combine port of the first wavelength splitting section is connected to the transmission line on the side of the first input/output end, n of the split ports of the first wavelength splitting section are connected each to one of the transmission lines on the side of the second input/output end, the other two split ports of the first wavelength splitting section are respectively connected to the combine ports of the second and the third wavelength splitting section, and the m split ports of the second wavelength splitting section and the (n−m) split ports of the third wavelength splitting section are connected each to one of the transmission lines on the side of the second input/output end.

16. A wavelength splitter as described in claim 10, comprising:

a wavelength splitting and combining section which comprises a single combine port and two split ports, and which splits and combines optical signals between the combine port and the split ports;

a first wavelength splitting section which comprises a single combine port and n split ports, and which demultiplexes an optical signal which has been inputted to the combine port into wavelength regions (optical frequency regions) which take as n central n wavelengths (optical frequencies) which are selected from within an equally spaced wavelength grid (an equally spaced frequency grid) which is determined by a uniform wavelength spacing of $\Delta\lambda d$ (a uniform optical frequency spacing of $\Delta fd$) within a transmission width of $\pm\Delta\lambda d/2$ ($\pm\Delta fd/2$);

and a second wavelength splitting section which comprises a single combine port and n split ports, and which demultiplexes an optical signal which has been inputted to the combine port into wavelength regions (optical frequency regions) which take as n central wavelengths (optical frequencies) which are selected from within an equally spaced wavelength grid (an equally spaced frequency grid) which is determined by a uniform wavelength spacing of $\Delta\lambda u$ (a uniform optical frequency spacing of $\Delta fu$) within a transmission width of $\pm\Delta\lambda u/2$ ($\pm\Delta fu/2$);

and wherein: the combine port of the wavelength splitting and combining section is connected to the transmission line on the side of the first input/output end, the two split ports of the wavelength splitting and combining section are connected each to one of the combine ports of the first and the second wavelength splitting section, the n split ports of the first wavelength splitting section are connected each to one of the transmission lines on the side of the second input/output end, and the n split ports of the second wavelength splitting section are connected each to one of the transmission lines on the side of the second input/output end.

17. A wavelength splitter as described in any one of claims 11 through 13, comprising:

a first wavelength splitting section which comprises a single combine port and (n+1) split ports, and which demultiplexes an optical signal which has been inputted to the combine port into wavelength regions (optical frequency regions) which take as (n+1) central wavelengths (optical frequencies) which are selected from within an equally spaced wavelength grid (an equally spaced frequency grid) which is determined with a uniform wavelength spacing of $\Delta\lambda d$ (a uniform optical frequency spacing of $\Delta fd$) within a transmission width of $\pm\Delta\lambda d/2$ ($\pm\Delta fd\ 1/2$);

a second and a third wavelength splitting sections, each of which comprises a single combine port and n split ports, and each of which demultiplexes an optical signal which has been inputted into the combine port into wavelength regions (optical frequency regions) which take as n central n wavelengths (optical frequencies) which are selected from within an equally spaced wavelength grid (an equally spaced frequency grid) which is determined with a uniform wavelength spacing of $\Delta\lambda u$ (a uniform optical frequency spacing of $\Delta fu$) within a transmission width of $\pm\Delta\lambda u/2$ ($\pm\Delta fu/2$); and n wavelength splitting and combining sections which combine or split optical signals;

and wherein: the combine port of the first wavelength splitting section is connected to the transmission line on the side of the first input/output end, n of the split ports of the first wavelength splitting section are connected each to a one of the transmission lines on the side of the second input/output end via a one of the wavelength splitting and combining section, the other split port of the first wavelength splitting section is connected to the combine port of the second wavelength splitting section, the n split ports of the second wavelength splitting section are connected each to one of the transmission lines on the side of the second input/output end via a one of the wavelength splitting and combining section, the n split ports of the third wavelength splitting section are connected each to a one of the transmission lines on the side of the second input/output end, and the combine port of the third wavelength splitting section is connected to the transmission line on the side of the first input/output end.

18. A wavelength splitter as described in any one of claims 14 through 16, further comprising n wavelength splitting and combining section which split and combine optical signals between the n split ports of the respective wavelength splitting sections and the transmission lines on the side of the second input/output end.

19. An optical network unit, comprising:
an optical transmitting and receiving section which comprises a wide spectrum light source section which transmits an optical signal whose optical spectral width is of wavelength width $\Delta\lambda$ (frequency width $\Delta f$), and an optical receiver which receives an optical signal;
an electrical processing section which is connected to the optical transmitting and receiving section, and which performs predetermined electrical processing;
an optical filter section which is provided at an input/output end of the optical network unit upon the side of a transmission line, and which, along with demultiplexing to the optical receiver a received optical signal which corresponds to the optical network unit from among all the optical signals which are inputted from the transmission line, also spectrum slices a transmitted optical signal which is transmitted from the wide spectrum light source section at a wavelength width (a frequency width) of less than or equal to ½ of the wavelength width $\Delta\lambda$ (the frequency width $\Delta f$), and outputs the spectrum-sliced optical signals to the transmission line; and
an optical connector which connects the optical filter section to the optical transmitting and receiving section so as to be attachable thereto and detachable therefrom.

20. An optical network unit as described in claim 19, wherein the optical filter section comprises:
a first wavelength filter which multiplexes and demultiplexes an optical signal of wavelength $\lambda send \pm \alpha$ (where a is a wavelength width (a frequency width) less than or equal to ¼ of the optical spectral width $\Delta\lambda$ (the wavelength width $\Delta f$)) which is obtained by spectrum slicing the transmitted optical signal, and an optical signal of wavelength range outside $\lambda send \pm \alpha$ and including at least the wavelength $\lambda receive$ of the received optical signal; and
a second wavelength filter which selects an optical signal of wavelength $\lambda receive \pm \beta$ (where $\beta$ is any desired wavelength width),
wherein, the transmitted optical signal is spectrum-sliced by the first wavelength filter at a central wavelength $\lambda send$ and is simultaneously stream multiplexed by the first wavelength filter with the optical signal from the transmission line, and then is outputted to the transmission line;
and wherein the optical signals other than the optical signal which is transmitted to the transmission line have been demultiplexed by the first wavelength filter from the optical signal transmitted from the transmission line, and the optical signal of wavelength $\lambda receive \pm \beta$ is demultiplexed by the second wavelength filter from the other optical signals which have no relationship with the optical network unit, and is outputted to the optical receiver.

21. An optical network unit as described in claim 19, wherein the optical filter section comprises:
a first wavelength filter which selects an optical signal of wavelength $\lambda send \pm \alpha$ (where a is a wavelength width (a frequency width) which is less than or equal to ¼ of the optical spectral width $\Delta\lambda$ (the frequency width $\Delta f$));
a second wavelength filter which multiplexes and demultiplexes an optical signal of wavelength $\lambda receive \pm \beta$ (where $\lambda receive$ is the wavelength of the received optical signal, and $\beta$ is any desired wavelength width), and an optical signal of wavelength range outside $\lambda receive \pm \beta$ and including at least the wavelength $\lambda send \pm \alpha$; and wherein the transmitted optical signal is spectrum-sliced by the first wavelength filter at a central wavelength $\lambda send$, is stream multiplexed by the second wavelength filter with the optical signal from the transmission line, and is outputted to the transmission line;
and wherein the optical signal of wavelength $\lambda receive \pm \beta$ is demultiplexed by the second wavelength filter from the other optical signals which have no relationship with the optical network unit and from the optical signals which are transmitted to the transmission line from the optical signal transmitted from the transmission line, and is outputted to the optical receiver.

22. An optical wavelength-division multiplexing access system, in which a center unit (OSU) and a plurality of n optical network units (ONUs) are connected via an optical power splitter and optical fiber transmission lines, and downstream optical signals whose wavelengths mutually differ from one another from the OSU to the respective ONUs and upstream optical signals whose wavelengths mutually differ from one another from the respective ONUs to the OSU are transmitted in both directions, wherein:
at least for the optical fiber transmission lines between from the respective ONUs and the OSU, the central wavelengths (the central frequencies) of the upstream optical signals which correspond to the ONUs are selected at will from within an equally spaced wavelength grid (an equally spaced frequency grid) which is determined by a uniform wavelength spacing of $\Delta\lambda u$ (a uniform optical frequency spacing of $\Delta fu$), and their wavelength errors (frequency errors) are set to be within $\pm\Delta\lambda u/2$ ($\pm\Delta fu/2$); and
wherein each of the ONUs comprises:
an optical transmitting and receiving section which comprises a wide spectrum light source section which transmits an upstream optical signal whose optical spectral width is twice or more the wavelength spacing $\Delta\lambda u$ ($\Delta fu$), and an optical receiver which receives a downstream optical signal;
an electrical processing section which is connected to the optical transmitting and receiving section, and which performs predetermined electrical processing;
an optical filter section which is provided at an input/output end of each the ONU upon the side of the optical fiber transmission line, and which, along with demultiplexing to the optical receiver the downstream optical signal which corresponds to each the ONU from among all the downstream optical signals which are inputted from the optical fiber transmission line, also spectrum slices the upstream optical signal which is transmitted from the wide spectrum light source section at a wavelength width (a frequency width) of within the wavelength spacing $\Delta\lambda u$ (the frequency spacing $\Delta fu$) centered upon the central wavelength (central frequency) which has been set for each the ONU, and outputs the spectrum-sliced optical signals to the optical fiber transmission line; and
an optical connector which connects the optical filter section to the optical transmitting and receiving section so as to be attachable thereto and detachable therefrom.

23. An optical wavelength-division multiplexing access system as described in claim 22, wherein:
at least between the OSU to each of the respective ONUs, the central wavelength (the central frequency) of each downstream optical signal which corresponds to each the ONU is selected at will from within an equally spaced wavelength grid (an equally spaced frequency grid) which is determined by a uniform wavelength spacing of $\Delta\lambda d$ (a uniform optical frequency spacing of $\Delta fd$), and its wavelength error (frequency error) is set to be within $\pm\Delta\lambda d/2(\pm\Delta fd/2)$;

and the wavelength spacing $\Delta\lambda d$ (the optical frequency spacing $\Delta fd$) of the downstream optical signals is set to be twice or more the wavelength spacing $\Delta\lambda u$ (the optical frequency spacing $\Delta fu$) of the upstream optical signals.

24. An optical wavelength-division multiplexing access system as described in claim 22, wherein:

the wavelength of the downstream optical signal from the OSU to the k-th one of the ONUs is set to $\lambda dk$, while the wavelength of the upstream optical signal from the k-th one of the ONUs to the OSU is set to $\lambda uk$;

and the optical filter section of the k-th ONU comprises:

a first wavelength filter which multiplexes and demultiplexes an optical signal of wavelength $\lambda uk\pm\alpha$ (where $\alpha$ is less than or equal to $\Delta\lambda u/2$), and an optical signal of wavelength range outside $\lambda uk\pm\alpha$ and including at least the wavelength $\lambda dk$; and a second wavelength filter which selects an optical signal of wavelength $\lambda dk\pm\beta$ (where $\beta$ is less than or equal to $\Delta\lambda d/2$);

and wherein the upstream optical signal of the k-th ONU emitted from the wide spectrum light section is spectrum-sliced by the first wavelength filter at a wavelength which takes the wavelength $\lambda uk$ as a central wavelength and is simultaneously stream multiplexed by the first wavelength filter with the downstream optical signal which is received by the k-th ONU, is outputted to the optical fiber transmission line;

while the downstream optical signal of the k-th ONU is demultiplexed by the first wavelength filter from the upstream optical signal for the k-th ONU which is transmitted to the optical fiber transmission line, is selectively demultiplexed from the other downstream optical signals by the second wavelength filter, and is outputted to the optical receiver.

25. An optical wavelength-division multiplexing access system as described in claim 22, wherein:

the wavelength of the downstream optical signal from the OSU to the k-th one of the ONUs is set to $\lambda dk$, while the wavelength of the upstream optical signal from the k-th one of the ONUs to the OSU is set to $\lambda uk$;

and the optical filter section of the k-th ONU comprises:

a first wavelength filter which selects an optical signal of wavelength $\lambda uk\pm\alpha$ (where $\alpha$ is less than or equal to $\Delta\lambda u/2$); and a second wavelength filter which multiplexes and demultiplexes an optical signal of wavelength $\lambda dk\pm\beta$ (where $\beta$ is less than or equal to $\Delta\lambda d/2$), and an optical signal of wavelength range outside $\lambda dk\pm\beta$ and including at least the wavelength $\lambda uk\pm\alpha$;

and wherein the upstream optical signal of the k-th ONU emitted from the wide spectrum light section is spectrum-sliced by the first wavelength filter at a wavelength which takes the wavelength $\lambda uk$ as a central wavelength and then is stream multiplexed by the second wavelength filter with the downstream optical signal which is received by the k-th ONU, is outputted to the optical fiber transmission line;

while the downstream optical signal of the k-th ONU is selectively demultiplexed by the second wavelength filter from the other downstream optical signals and from the upstream optical signal for the k-th ONU which is transmitted to the optical fiber transmission line, and is outputted to the optical receiver.

* * * * *